(12) United States Patent
Kim et al.

(10) Patent No.: US 10,387,192 B2
(45) Date of Patent: Aug. 20, 2019

(54) MOBILE TERMINAL OPERATING SYSTEM CONVERSION DEVICE AND METHOD, VEHICLE, AND OPERATING SYSTEM TRANSMISSION DEVICE AND METHOD FOR VEHICLE

(71) Applicant: LG ELECTRONICS INC., Seoul (KR)

(72) Inventors: Sungmin Kim, Seoul (KR); Byeongrim Jo, Seoul (KR); Sora Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 15/513,793

(22) PCT Filed: May 27, 2015

(86) PCT No.: PCT/KR2015/005325
§ 371 (c)(1),
(2) Date: Mar. 23, 2017

(87) PCT Pub. No.: WO2016/047887
PCT Pub. Date: Mar. 31, 2016

(65) Prior Publication Data
US 2018/0189098 A1    Jul. 5, 2018

(30) Foreign Application Priority Data

Sep. 24, 2014 (KR) .................. 10-2014-0127659

(51) Int. Cl.
*G06F 1/24*      (2006.01)
*G06F 9/00*      (2006.01)
(Continued)

(52) U.S. Cl.
CPC ............... *G06F 9/48* (2013.01); *B60R 16/02* (2013.01); *B60R 16/023* (2013.01);
(Continued)

(58) Field of Classification Search
CPC ..... G06F 9/48; G06F 9/24; G06F 8/60; B60R 16/037; B60R 16/023; B60R 16/02; H04B 1/40
See application file for complete search history.

(56) References Cited

U.S. PATENT DOCUMENTS

2006/0010314 A1* 1/2006 Xu .................. G06F 9/45545
713/2
2007/0220242 A1* 9/2007 Suzuki ................. G06F 8/65
713/1

FOREIGN PATENT DOCUMENTS

CN         2884716 Y       3/2007
CN       102572093 A       7/2012
(Continued)

OTHER PUBLICATIONS

Park et al., English Translation of KR 20110115489, Oct. 21, 2011 (Year: 2011).*

*Primary Examiner* — Xuxing Chen
(74) *Attorney, Agent, or Firm* — Birch, Stewart, Kolasch & Birch, LLP

(57) ABSTRACT

The present invention relates to. The operating system conversion device for a mobile terminal operates by means of a first operating system (OS), and, when connected to a vehicle, operates by means of an agent, the operating system conversion device comprising: a reception unit which receives, from the vehicle, a second operating system which is different from the first operating system and is exclusively used for the vehicle during connection with the vehicle; and a conversion unit which, during connection with the vehicle,
(Continued)

converts the operating system from the first operating system to the second operating system.

14 Claims, 24 Drawing Sheets

(51) Int. Cl.
| | | |
|---|---|---|
| | *G06F 9/48* | (2006.01) |
| | *B60R 16/02* | (2006.01) |
| | *G06F 9/24* | (2006.01) |
| | *H04B 1/40* | (2015.01) |
| | *B60R 16/023* | (2006.01) |
| | *B60R 16/037* | (2006.01) |
| | *G06F 8/60* | (2018.01) |

(52) U.S. Cl.
CPC .............. *B60R 16/037* (2013.01); *G06F 9/24* (2013.01); *H04B 1/40* (2013.01); *G06F 8/60* (2013.01)

(56) References Cited

FOREIGN PATENT DOCUMENTS

| | | |
|---|---|---|
| CN | 103347106 A | 10/2013 |
| EP | 2469816 A1 | 6/2012 |
| KR | 10-2010-0122332 A | 11/2010 |
| KR | 10-2011-0085767 A | 7/2011 |
| KR | 10-2011-0115489 A | 10/2011 |
| KR | 10-2012-0066239 A | 6/2012 |

\* cited by examiner (a)　　　　　　　　　(b)

(a)           (b)

MOBILE TERMINAL OPERATING SYSTEM CONVERSION DEVICE AND METHOD, VEHICLE, AND OPERATING SYSTEM TRANSMISSION DEVICE AND METHOD FOR VEHICLE

CROSS REFERENCE TO RELATED APPLICATIONS

This application is the National Phase of PCT International Application No. PCT/KR2015/005325, filed on May 27, 2015, which claims priority under 35 U.S.C. 119(a) to Patent Application No. 10-2014-0127659, filed in the Republic of Korea on Sep. 24, 2014, all of which are hereby expressly incorporated by reference into the present application.

TECHNICAL FIELD

The present invention relates to a mobile terminal operating system switching device and method, a vehicle, and an operating system transmission device and method for the vehicle and, more particularly, to an operating system switching device and method of a mobile terminal capable of being switched to a vehicle-dedicated operating system upon connection with a vehicle, the vehicle connected with the mobile terminal, and an operating system transmission device and method for the vehicle.

BACKGROUND ART

Terminals may be broadly classified into mobile/portable terminals or stationary terminals according to their mobility. Mobile terminals may also be classified into handheld terminals or vehicle mounted terminals according to whether or not a user can directly carry the terminal.

Mobile terminals have become increasingly more functional. Examples of such functions include data and voice communication, capturing images and video via a camera, recording audio, playing music files via a speaker system, and displaying images and video on a display. Some mobile terminals further include a gaming function or a multimedia player function. More recently, mobile terminals have been configured to receive broadcast and multicast signals which permit viewing of content such as videos and television programs.

A vehicle refers to an apparatus driven on a road by rolling wheels for the purpose of transporting persons or goods.

Recently, as interest in smart cars has increased, research into a method of connecting a vehicle and a mobile terminal to control the vehicle through the mobile terminal has been actively conducted.

When the mobile terminal operates in a state of being connected to the vehicle, malfunction of the mobile terminal may be generated due to overload. For example, when malfunction of the mobile terminal is generated due to overload while controlling vehicle safety through the mobile terminal, the security of passengers of the vehicle, passengers of another vehicle and pedestrians may be threatened.

DISCLOSURE

Technical Problem

Accordingly, an object of the present invention is to address the above-noted and other problems. Another object of the present invention is to provide an operating system switching device and method of a mobile terminal capable of being switched to a vehicle-dedicated operating system upon connection with a vehicle, the vehicle connected with the mobile terminal, and an operating system transmission device and method for the vehicle.

Technical Solution

According to an aspect of the present invention, an operating system (OS) switching device of a mobile terminal operating using a first OS and operating as an agent upon connection with a vehicle includes a reception unit configured to receive, from the vehicle, a second OS different from the first OS and dedicated to the vehicle upon connection with the vehicle and a switching unit configured to switch the OS from the first OS to the second OS upon connection with the vehicle.

According to another aspect of the present invention, an operating system (OS) switching device of a mobile terminal operating using a first OS and operating as an agent upon connection with a vehicle includes a memory configured to store a second OS different from the first OS and dedicated to the vehicle upon connection with the vehicle and a switching unit configured to switch the OS from the first OS to the second OS upon connection with the vehicle.

According to another aspect of the present invention, an operating system (OS) transmission device of a vehicle capable of being connected to a mobile terminal operating using a first OS includes a memory configured to store a second OS different from the first OS dedicated to the mobile terminal upon connection with the vehicle and a transceiver configured to transmit the second OS to the mobile terminal upon connection with the mobile terminal.

According to another aspect of the present invention, a vehicle capable of being connected to a mobile terminal operating using a first operating system (OS) includes a second memory configured to store a second OS different from the first OS and dedicated to the mobile terminal upon connection with the vehicle, a second interface configured to transmit and receive data to and from the mobile terminal, a second controller configured to transmit the second OS to the mobile terminal through the second interface upon connection with the mobile terminal. The second interface includes a connector including a connection port configured to compatible with a plurality of different types of mobile terminals, a cradle configured to compatibly mount each of the plurality of mobile terminals and a charger configured to supply power to the mobile terminal.

According to another aspect of the present invention, an operating system (OS) switching method of a mobile terminal operating using a first OS and operating as an agent upon connection with a vehicle includes receiving, from the vehicle, a second OS different from the first OS and dedicated to the vehicle upon connection with the vehicle and switching the OS from the first OS to the second OS upon connection with the vehicle.

In the OS switching method, the switching may include switching the OS upon receiving user input in a state of being connected to the vehicle.

The OS switching method may further include determining whether the first OS has been backed up in the vehicle according to user input upon switching the OS.

The OS switching method may further include displaying OS switching information upon switching the OS.

In the OS switching method, the switching may include switching the OS from the second OS to the first OS upon completing driving of the vehicle after connection with the vehicle.

In the OS switching method, the receiving may include receiving the backed-up first OS upon completing driving of the vehicle after connection with the vehicle.

The OS switching method may further include storing data of a plurality of applications and driving only a vehicle application among the plurality of applications upon connection with the vehicle.

The OS switching method may further include storing data of a plurality of applications and preferentially driving only a vehicle safety-related application among the plurality of applications upon connection with the vehicle.

The OS switching method may further include storing vehicle driving information or user driving habit information collected from when the vehicle is connected to when vehicle driving is completed, upon completing driving of the vehicle after connection with the vehicle.

In the OS switching method, in the receiving, reception from a plurality of vehicles is possible.

The OS switching method may further include distinguishably storing information on each of the plurality of vehicles received through the reception unit.

In the OS switching method, the information may include at least one of a vehicle ID, a refueling history, a mileage, a gas mileage, remaining fuel and a maintenance history of the vehicle.

The OS switching method may further include storing ID information of each of the plurality of vehicles and determining whether ID information of a first vehicle received through the first interface matches any one of ID information stored in a first memory upon connection with the first vehicle.

The OS switching method may further include storing data of a plurality of applications and installing a patch for the plurality of applications upon switching to the second OS.

The OS switching method may further include storing the second OS received by the reception unit from the vehicle.

According to another aspect of the present invention, an operating system (OS) switching method of a mobile terminal operating using a first OS and operating as an agent upon connection with a vehicle includes storing a second OS different from the first OS and dedicated to the vehicle upon connection with the vehicle and switching the OS from the first OS to the second OS upon connection with the vehicle.

According to another aspect of the present invention, an operating system (OS) transmission method of a vehicle capable of being connected to a mobile terminal operating using a first OS includes storing a second OS different from the first OS and dedicated to the mobile terminal upon connection with the vehicle and transceiving the second OS to the mobile terminal upon connection with the mobile terminal.

In the OS transmission method, the transceiving may include compatibly performing transmission and reception with respect to a plurality of mobile terminals, and the storing may include storing information on the plurality of mobile terminals received through the transceiver per mobile terminal.

In the OS transmission method, the information may include past vehicle driving information or driving habit information stored in the mobile terminal.

In the OS transmission method, the storing may include storing ID information of each of the plurality of mobile terminals, and the OS transmission method may further include determining whether ID information of a first mobile terminal received through a second interface matches any one of ID information of the first mobile terminal stored in a second memory upon connection with the first mobile terminal.

In the OS transmission method, the storing may include storing vehicle driving information or user driving habit information collected from when the vehicle is connected to when driving of the vehicle is completed, upon completing driving of the vehicle.

The OS transmission method may further include a backup determination unit configured to determine whether the first OS is backed up in the memory.

According to another aspect of the present invention, a vehicle capable of being connected to a mobile terminal operating using a first operating system (OS) includes a second memory configured to store a second OS different from the first OS and dedicated to the mobile terminal upon connection with the vehicle, a second interface configured to transmit and receive data to and from the mobile terminal, a second controller configured to transmit the second OS to the mobile terminal through the second interface upon connection with the mobile terminal. The second interface includes a connector including a connection port configured to compatible with a plurality of different types of mobile terminals, a cradle configured to compatibly mount each of the plurality of mobile terminals and a charger configured to supply power to the mobile terminal.

Advantageous Effects

A mobile terminal and an operating system (OS) transmission device and method thereof and a vehicle and an OS transmission device and method thereof according to at least one embodiment of the present invention have the following effects.

First, when a mobile terminal is connected to a vehicle to operate as an agent of the vehicle, switching to a vehicle-dedicated OS is performed, thereby preventing malfunction of the mobile terminal due to overload.

Second, when the mobile terminal is connected to the vehicle to operate, since only a vehicle related application or a safety related application is executed, it is possible to reduce overload upon processing data of the mobile terminal.

Third, when one mobile terminal is connected to a plurality of vehicles, it is possible to manage data of each of the plurality of vehicles.

Fourth, when one vehicle is connected to a plurality of mobile terminals, it is possible to manage data of each of the plurality of mobile terminals.

The other effects will be directly or implicitly disclosed in the detailed description of the embodiments of the present invention.

BEST MODE

Exemplary embodiments of the present invention will be described below in detail with reference to the accompanying drawings in which the same reference numbers are used throughout this specification to refer to the same or like parts and a repeated description thereof will be omitted. The suffixes "module" and "unit" of elements herein are used for convenience of description and thus can be used interchangeably and do not have any distinguishable meanings or functions. In describing the present invention, a detailed description of known functions and configurations will be omitted when it may obscure the subject matter of the present invention. The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

It will be understood that, although the terms first, second, etc. may be used herein to describe various elements of the present invention, these terms are only used to distinguish one element from another element and essential, order, or sequence of corresponding elements are not limited by these terms.

It will be understood that when one element is referred to as being "connected to" or "coupled to" another element, one element may be "connected to" or "coupled to", another element via a further element although one element may be directly connected to or directly accessed to another element.

A singular representation may include a plural representation unless the context clearly indicates otherwise.

It will be understood that the terms 'comprise', 'include', etc., when used in this specification, specify the presence of several components or several steps and part of the components or steps may not be included or additional components or steps may further be included.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

Hereinafter, an operating system switching device and method of a mobile terminal capable of being switched to a vehicle-dedicated operating system upon connection with a vehicle, the vehicle connected with the mobile terminal, and an operating system transmission device and method for the vehicle will be described with reference to the accompanying drawings.

Figure 1A:
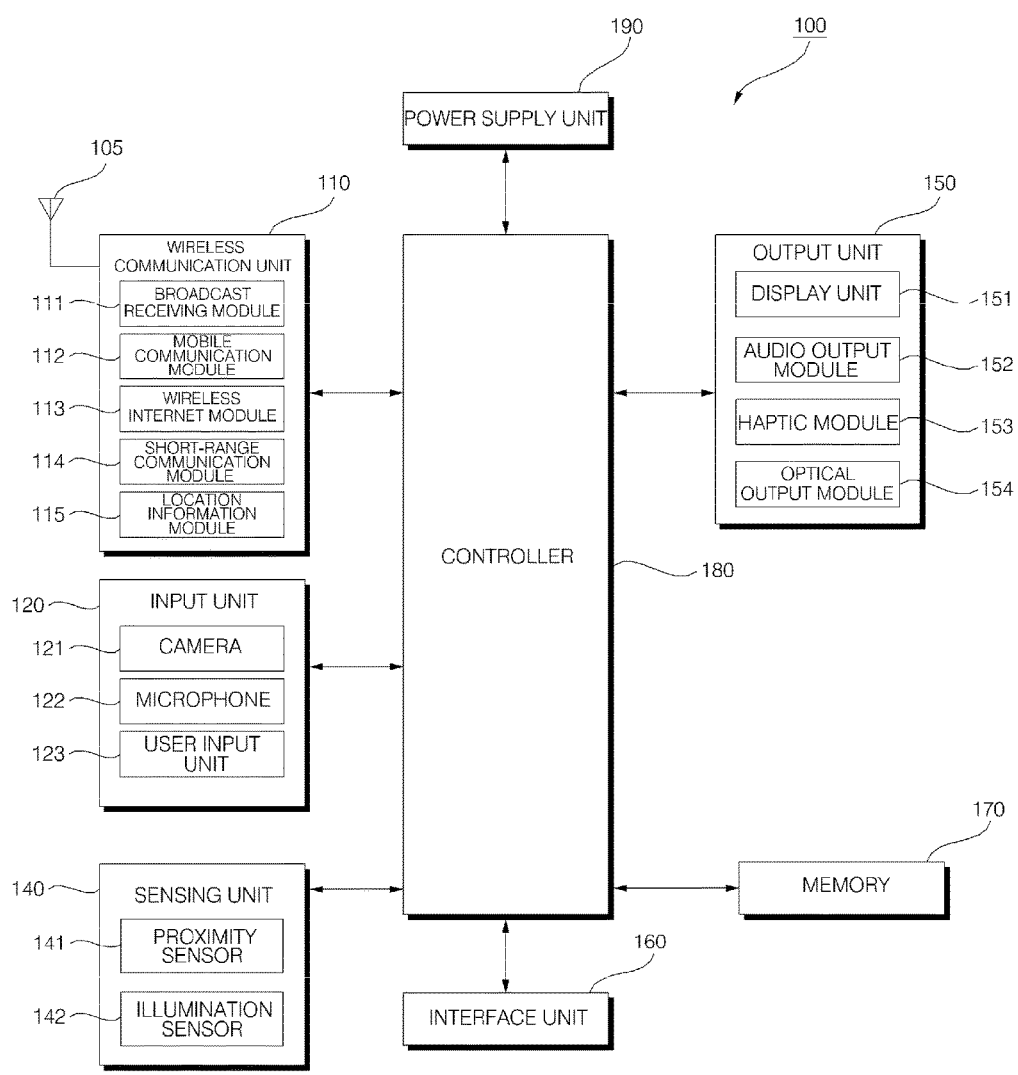
FIG. 1a is a block diagram illustrating a mobile terminal related to the present invention.
Figure 1B:
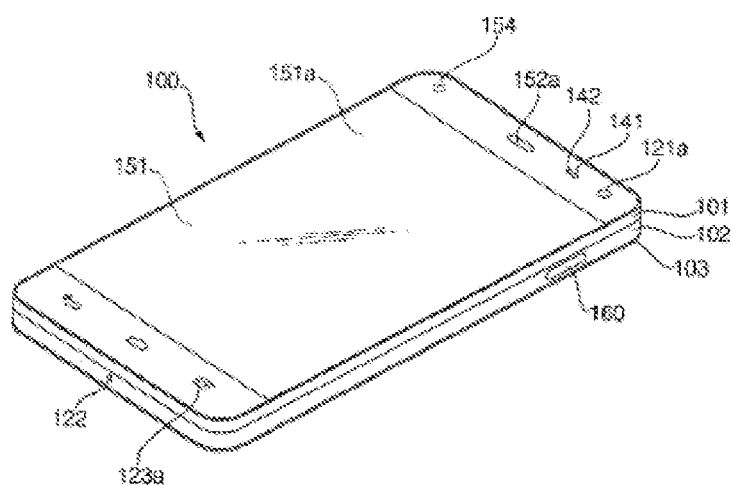
FIGS. 1b and c are diagrams showing an example of a mobile terminal related to the present invention when viewed in different directions.
Figure 1C:
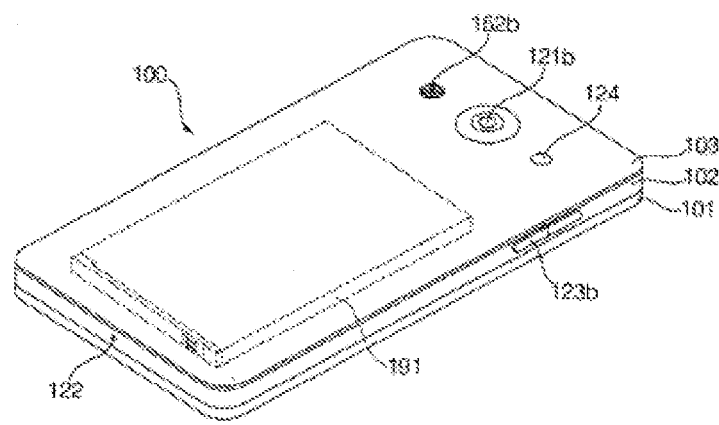

Referring to FIGS. 1a to 1c, FIG. 1a is a block diagram illustrating a mobile terminal related to the present invention, and FIGS. 1b and 1c are diagrams showing an example of a mobile terminal related to the present invention when viewed in different directions.

The mobile terminal 100 may include a wireless communication unit 110, an input unit 120, a sensing unit 140, a first output unit 150, a first interface 160, a first memory 170, a first controller 180, and a power supply 190.

The wireless communication unit 110 includes one or more modules which perform communication such as wireless communication between the mobile terminal 100 and a wireless communication system, between the mobile terminal 100 and another mobile terminal 100, and between the mobile terminal 100 and an external server. In addition, the wireless communication unit 110 may include one or more modules for connecting the mobile terminal 100 to one or more networks.

Further, the wireless communication unit 110 may include one or more of a broadcast reception module 111, a mobile communication module 112, a wireless Internet module 113, a short-range communication module 114, and a location information module 115.

The input unit 120 includes a camera 121 or an image input unit for receiving an input image signal, a microphone 122 or an audio input unit for receiving an input audio signal, and a user input unit 123 (for example, a touch key, a push key, a mechanical key, and the like) for receiving information from a user. Audio data or image data collected by the input unit 120 may be analyzed and processed as a control command of a user.

The sensing unit 140 may include one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint (finger scan) sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile terminal disclosed in this specification may be configured to combine and utilize information obtained from at least two sensors of such sensors.

The first output unit 150 is typically configured to output various types of information, such as audio, video, tactile output, and the like. The first output unit 150 may include a display 151, an audio output module 152, a haptic module 153, and an optical output module 154. The display 151 may have an inter-layered structure or an integrated structure with a touch sensor in order to realize a touchscreen. The touchscreen may provide an output interface between the mobile terminal 100 and a user, as well as function as the user input unit 123 which provides an input interface between the mobile terminal 100 and the user.

The first interface 160 serves as an interface with various types of external devices that can be coupled to the mobile terminal 100. The first interface 160, for example, may include any of connection ports with the vehicle 200, wired or wireless headset ports, external power supply ports, wired or wireless data ports, first memory card ports, ports for connecting a device having an identification module, audio input/output (I/O) ports, video I/O ports, earphone ports, and the like. In some cases, the mobile terminal 100 may perform adequate control functions associated with a connected external device, in response to the external device being connected to the first interface 160.

The first memory 170 is typically implemented to store data to support various functions of the mobile terminal 100. For instance, the first memory 170 may be configured to store application programs or applications executed in the mobile terminal 100, data or instructions for operations of the mobile terminal 100, and the like. Some of these application programs may be downloaded from an external server via wireless communication. Other application programs may be installed within the mobile terminal 100 at time of manufacture or shipping, for basic functions of the mobile terminal 100 (for example, receiving a call, placing a call, receiving a message, sending a message, and the like). The application programs may be stored in the first memory 170, installed in the mobile terminal 100, and executed by the first controller 180 to perform an operation (or function) of the mobile terminal. The first memory 170 performs a function corresponding to the memory of the present invention.

The first controller 180 typically functions to control overall operation of the mobile terminal 100, in addition to the operations associated with the application programs. The first controller 180 may provide or process information or functions appropriate for a user by processing signals, data, information and the like, which are input or output by the above-described components, or executing application programs stored in the first memory 170.

In addition, the first controller 180 may control some or all of the components illustrated in FIG. 1a, for execution of an application program stored in the first memory 170. Further, the first controller 180 may operate at least two of the components included in the mobile terminal 100, for execution of the application program.

The power supply 190 can be configured to receive external power or internal power to supply appropriate power required for operating elements and components included in the mobile terminal 100, under control of the first controller 180. The power supply 190 may include a battery, and the battery may be embedded in the terminal body, or be configured to be detachable from the terminal body.

At least some of the components may operate in cooperation with each other in order to implement the method of operating or controlling the mobile terminal according to the below-described various embodiments. In addition, the method of operating or controlling the mobile terminal may be implemented in the mobile terminal by executing at least one application program stored in the first memory 170.

Prior to various embodiments implemented through the mobile terminal 100, the above-described components will be described in more detail with reference to FIG. 1a.

Regarding the wireless communication unit 110, the broadcast reception module 111 of the wireless communication unit 110 receives a broadcast signal and/or broadcast associated information from an external broadcast management server via a broadcast channel. The broadcast channel may include a satellite channel and a terrestrial channel. In some embodiments, two or more broadcast reception modules may be included in the mobile terminal 100, for simultaneous reception of two or more broadcast channels or for switching between broadcast channels.

The mobile communication module 112 can transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, the wireless Internet module 113 for performing such wireless Internet access may be understood as part of the mobile communication module 112. As such, the wireless Internet module 113 may cooperate with, or function as, the mobile communication module 112.

The short-range communication module 114 is configured to facilitate short-range communication and to support short-range communication using Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 generally supports wireless communication between a mobile terminal 100 and a wireless communication system, between the mobile terminal 100 and another mobile terminal 100 or between the mobile terminal 100 and a network where another mobile terminal 100 (or an external server) is located, via wireless area networks. One example of the wireless area networks is a wireless personal area networks.

In some embodiments, another mobile terminal 100 may be a wearable device, for example, a smart watch, smart glasses or a head mounted display (HMD), which is able to exchange data with the mobile terminal 100 (or otherwise cooperate with the mobile terminal 100). The short-range communication module 114 may sense (or recognize) a wearable device capable of performing communication with the mobile terminal 100 in the vicinity of the mobile terminal 100. In addition, when the sensed wearable device is a device authenticated to communicate with the mobile terminal 100, the first controller 180, for example, may transmit at least a part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to acquire the position (or the current position) of the mobile terminal. As an example, the location information module 115 includes a Global Position System (GPS) module or a Wi-Fi module. As one example, when the mobile terminal uses a GPS module, the position of the mobile terminal may be acquired using a signal sent from a GPS satellite. As another example, when the mobile terminal uses the Wi-Fi module, the position of the mobile terminal can be acquired based on information related to a wireless access point (AP) which transmits or receives a wireless signal to or from the Wi-Fi module. If desired, the location information module 115 may alternatively or additionally perform a function of any one of the other modules of the wireless communication unit 110 to obtain data related to the position of the mobile terminal. The location information module 115 is used to acquire the position (or the current position) of the mobile terminal and is not limited to the module for directly calculating or acquiring the position of the mobile terminal.

Next, the input unit 120 may receive video information (or signal), audio information (or signal), data or user input information. For reception of video information, the mobile terminal 100 may include one or a plurality of cameras 121. The camera 121 may process image frames of still pictures or video obtained by image sensors in a video call more or an image capture mode. The processed image frames can be displayed on the display 151 or stored in memory 170. In some cases, the plurality of cameras 121 provided in the mobile terminal 100 may be arranged in a matrix, and the mobile terminal 100 may receive a plurality of pieces of image information having various angles or focal points through the cameras 121 arranged in the matrix. As another example, the plurality of cameras 121 may be located in a stereoscopic arrangement to acquire left and right images for implementing a stereoscopic image.

The microphone 122 processes an external acoustic signal into electrical audio data. The processed audio data may be variously used according to function (application program) executed in the mobile terminal 100. If desired, the microphone 122 may include various noise removal algorithms to remove unwanted noise generated in the process of receiving the external acoustic signal.

The user input unit 123 receives information from a user. When information is received through the user input unit 123, the first controller 180 may control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen. On the other hand, the virtual key or the visual key may be displayed on the touchscreen in various shapes, for example, graphics, text, icon, video, or a combination thereof.

The sensing unit 140 senses one or more of internal information of the mobile terminal, surrounding environment information of the mobile terminal, user information or the like, and generates a sensing signal corresponding thereto. The first controller 180 may control operation of the mobile terminal 100 or perform data processing, a function or an operation associated with an application program installed in the mobile terminal 100, based on the sensing signal. The sensing unit 140 may be implemented using any of a variety of sensors, some of which will now be described in more detail.

First, the proximity sensor 141 may include a sensor to sense presence or absence of an object approaching or located near a predetermined detection surface, by using an electromagnetic field, infrared light, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitive type proximity sensor, a magnetic type proximity sensor, an infrared proximity sensor, and the like. When the touchscreen is a capacitive touchscreen, the proximity sensor 141 can sense proximity of an object due to change in an electromagnetic field caused by approach of the object with conductivity. In this case, the touchscreen (touch sensor) may also be categorized as a proximity sensor.

For convenience of description, the term "proximity touch" will often be referred to herein to denote the scenario in which an object is positioned to be proximate to the touchscreen without contacting the touchscreen. The term "contact touch" will often be referred to herein to denote the scenario in which an object contacts the touchscreen. A position corresponding to the proximity touch of the object relative to the touchscreen will correspond to a position where the object is perpendicular to the touchscreen. The proximity sensor 141 may sense proximity touch, and proximity touch patterns (for example, proximity touch distance, proximity touch direction, proximity touch speed, proximity touch time, proximity touch position, proximity touch moving status, and the like). In general, the first controller 180 may process data (or information) corresponding to proximity touch and proximity touch patterns sensed by the proximity sensor 141, and output visual information corresponding to the processed data on the touchscreen. In addition, the first controller 180 can control the mobile terminal 100 to execute different operations or process different data (or information) according to whether a touch of the same point on the touchscreen is either a proximity touch or a contact touch.

A touch sensor can sense a touch (touch input) applied to the touchscreen (or the display 151) using any of a variety of touch methods such as resistive, capacitive, infrared, ultrasonic and magnetic field methods.

As one example, the touch sensor may be configured to convert changes in pressure applied to a specific part of the touchscreen or convert change in capacitance occurring at a specific part of the touchscreen into electrical input signals. The touch sensor may also be configured to sense not only a touched position and a touched area, but also touch pressure and/or touch capacitance of a touch object. The touch object is generally used to apply touch input to the touch sensor. Examples of typical touch objects include a finger, a touch pen, a stylus, a pointer, or the like.

When touch input is sensed by a touch sensor, a signal(s) corresponding thereto may be transmitted to a touch controller. The touch controller may process the received signal(s), and then transmit corresponding data to the first controller 180. Accordingly, the first controller 180 may sense which region of the display 151 has been touched. Here, the touch controller may be a component included separately from the first controller 180 or the first controller 180.

In some embodiments, the first controller 180 may execute the same or different controls according to a type of touch object that touches the touchscreen (or a touch key provided in addition to the touchscreen). Whether to execute the same or different controls according to the type of the touch object may be decided based on a current operating state of the mobile terminal 100 or a currently executed application program, for example.

The touch sensor and the proximity sensor may be implemented individually, or in combination, to sense various types of touches such as a short (or tap) touch, a long touch, a multi-touch, a drag touch, a flick touch, a pinch-in touch, a pinch-out touch, a swipe touch, a hovering touch, and the like.

If desired, an ultrasonic sensor may recognize position information of a touch object using ultrasonic waves. The first controller 180, for example, may calculate a position of a wave generation source based on information sensed by an optical sensor and a plurality of ultrasonic sensors. Light is much faster than ultrasonic waves, that is, the time for the light to reach the optical sensor is much shorter than the time for the ultrasonic wave to reach the ultrasonic sensor. Using such a property, the position of the wave generation source may be calculated. For instance, the position of the wave generation source may be calculated using the time difference from the time that the ultrasonic wave reaches the sensor based on the light as a reference signal.

The camera 121 included in the input unit 120 typically includes at least one a camera sensor (CCD, CMOS etc.), a photo sensor (or image sensors), and a laser sensor.

The camera 121 and a laser sensor may be combined to detect a touch of an object to be sensed with respect to a 3D stereoscopic image. The photo sensor may be laminated on the display device. The photo sensor may be configured to scan movement of the object to be sensed in proximity to the touchscreen. In more detail, the photo sensor may include photodiodes and transistors (TRs) in rows and columns to scan the object placed on the photo sensor using an electrical signal which changes according to the quantity of applied light. Namely, the photo sensor may calculate the coordinates of the object to be sensed according to change in amount of light, thereby obtaining position information of the object to be sensed.

The display 151 is generally configured to display (output) information processed in the mobile terminal 100. For example, the display 151 may display execution screen information of an application program executed by the mobile terminal 100 or user interface (UI) and graphical user interface (GUI) information according to the execution screen information.

In some embodiments, the display 151 may be implemented as a stereoscopic display unit for displaying stereoscopic images.

A typical stereoscopic display unit may employ a 3D display scheme such as a stereoscopic scheme (glasses scheme), an auto-stereoscopic scheme (glassless scheme), a projection scheme (holographic scheme), or the like.

The audio output module 152 is generally configured to output audio data received from the wireless communication unit 110 or stored in the first memory 170 in a call signal reception mode, a call mode, a record mode, a voice recognition mode, a broadcast reception mode, and the like. The audio output module 152 can output an audio signal related to a particular function (e.g., a call signal reception sound, a message reception sound, etc.) performed by the mobile terminal 100. The audio output module 152 may also include a receiver, a speaker, a buzzer, or the like.

A haptic module 153 can be configured to generate various tactile effects that a user feels. A typical example of a tactile effect generated by the haptic module 153 is vibration. The strength, pattern and the like of the vibration generated by the haptic module 153 can be controlled by user selection or setting of the first controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, touch to the skin, contact of an electrode, electrostatic force, an effect of reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating event generation using light of a light source of the mobile terminal 100. Examples of events generated in the mobile terminal 100 may include message reception, call signal reception, a missed call, an alarm, a schedule notice, email reception, information reception through an application, and the like.

A signal output by the optical output module 154 may be implemented in such a manner that the mobile terminal emits monochromatic light or light with a plurality of colors through a front surface or a rear surface thereof. The signal output may be terminated as the mobile terminal senses that a user has checked the generated event, for example.

The first interface 160 serves as an interface with external devices to be connected with the mobile terminal 100. For example, the first interface 160 can receive data from an external device or receive power to transfer power to elements and components within the mobile terminal 100, or transmit internal data of the mobile terminal 100 to such an external device. The first interface 160 may include wired or wireless headset ports, external power supply ports, wired or wireless data ports, first memory card ports, ports for connecting a device having an identification module, audio input/output (I/O) ports, video I/O ports, earphone ports, or the like.

The identification module may be a chip that stores a variety of information for granting use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the first interface 160.

When the mobile terminal 100 is connected with an external cradle, the first interface 160 can serve as a passage to allow power from the cradle to be supplied to the mobile terminal 100 or may serve as a passage to allow various command signals input by the user from the cradle to be transferred to the mobile terminal 100 therethrough. Various command signals or power input from the cradle may operate as signals for recognizing that the mobile terminal 100 is properly mounted on the cradle.

The first memory 170 can store programs to support operations of the first controller 180 and temporarily store input/output data (for example, phonebook, messages, still images, videos, etc.). The first memory 170 may store data related to various patterns of vibrations and audio which are output in response to touch inputs on the touchscreen.

The first memory 170 may include one or more types of storage media including a flash first memory, a hard disk, a solid state drive, a silicon disk drive, a multimedia card micro type memory, a card-type first memory (e.g., SD or DX first memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic first memory, a magnetic disk, an optical disc, and the like. The mobile terminal 100 may also be operated in relation to a network storage device that performs the storage function of the first memory 170 over the Internet.

As described above, the first controller 180 may typically control operation related to the application program and the general operations of the mobile terminal 100. For example, the first controller 180 may set or release a lock state for restricting a user from inputting a control command with respect to applications when a status of the mobile terminal meets a preset condition.

The first controller 180 can also perform control and processing associated with voice calls, data communication, video calls, and the like, or perform pattern recognition processing to recognize handwriting input or picture drawing input performed on the touchscreen as characters or images, respectively. In addition, the first controller 180 can control one or a combination of these components in order to implement various exemplary embodiments disclosed herein.

The power supply 190 receives external power or internal power and supplies the appropriate power required to operate respective elements and components included in the mobile terminal 100, under control of the first controller 180. The power supply 190 may include a battery, which is typically rechargeable or be detachably coupled to the terminal body for charging.

The power supply 190 may include a connection port. The connection port may be configured as one example of the first interface 160 to which an external charger for supplying power to recharge the battery is electrically connected.

As another example, the power supply 190 may be configured to recharge the battery in a wireless manner without use of the connection port. In this example, the power supply 190 can receive power from an external wireless power transmitter, using at least one of an inductive coupling method which is based on magnetic induction or a magnetic resonance coupling method which is based on electromagnetic resonance.

Various embodiments described herein may be implemented in a computer-readable medium or similar medium using, for example, software, hardware, or any combination thereof.

Referring now to FIGS. 1b and 1c, the mobile terminal 100 include a bar-type terminal body. However, the mobile terminal 100 may alternatively be implemented in any of a variety of different configurations, such as watch-type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile. However, such teachings with regard to a particular type of mobile terminal will generally apply to other types of mobile terminals as well.

The terminal body may refer to the mobile terminal 100 as at least one assembly.

The mobile terminal 100 generally includes a case (for example, frame, housing, cover, and the like) forming the appearance of the terminal. In this embodiment, the mobile terminal 100 includes a front case 101 and a rear case 102. Various electronic components are incorporated into a space formed between the front case 101 and the rear case 102. At least one middle case may be additionally positioned between the front case 101 and the rear case 102.

The display 151 is located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components mounted to the rear case 102 include a detachable battery, an identification module, a memory card, and the like. A rear cover 103 covering the electronic components may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this example, a mobile terminal 100 having a unified body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 includes a display 151, first and second audio output modules 152a and 152b, a proximity sensor 141, an illumination sensor 142, an optical output module 154, first and second cameras 121a and 121b, first and second manipulation units 123a/123b, a microphone 122, an first interface 160 and the like.

The mobile terminal 100 shown in FIGS. 1b and 1c will be described. The display 151, the first audio output module 152a, the proximity sensor 141, an illumination sensor 142, the optical output module 154, the first camera 121a and the first manipulation unit 123a are arranged in a front surface of the terminal body, the second manipulation unit 123b, the microphone 122 and the first interface 160 are arranged in a side surface of the terminal body, and the second audio output modules 152b and the second camera 121b are arranged in a rear surface of the terminal body.

However, it is to be understood that alternative arrangements are possible within the teachings of the present disclosure. Some components may be omitted or rearranged. For example, the first manipulation unit 123a may not be located on the front surface of the terminal body, and the second audio output module 152b may not located on the rear surface of the terminal body but may be located on the side surface of the terminal body.

The display 151 displays (outputs) information processed in the mobile terminal 100. The display 151 may display execution screen information of an application program executed in the mobile terminal 100 or user interface (UI) or graphical user interface (GUI) information according to such execution screen information.

The display 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Two or more display units 151 may be used according to implementation of the mobile terminal 100. For instance, a plurality of the display units may be arranged on one side of the mobile terminal 100, either spaced apart from each other or integrated, or these display units may be arranged on different surfaces of the mobile terminal 100.

The display 151 may also include a touch sensor which senses touch input received at the display 151 so as to receive a control command in a touching manner. When a touch is input to the display 151, the touch sensor may be configured to sense this touch and the first controller 180 may generate a control command corresponding to the touch. The content which is input in the touching manner may be text or a numerical value, or a menu item which can be indicated or designated in various modes.

The touch sensor may be configured in the form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touchscreen together with the touch sensor. Here, the touchscreen may serve as the user input unit 123 (see FIG. 1a). Therefore, the touchscreen may replace at least some of the functions of the first manipulation unit 123a.

The first audio output module 152a may be implemented in the form of a receiver to deliver telephone conversation to ears of a user or a loud speaker to output various alarm sounds, multimedia audio reproduction sounds, and the like.

The window 151a of the display 151 will typically include an audio hole to allow sound generated by the first audio output module 152a to pass. The present invention is not limited thereto and sound may be released along an assembly gap between the structural bodies (for example, a gap between the window 151a and the front case 101). In this case, a hole independently formed to output sound may not be seen or is otherwise hidden in terms of appearance, thereby further simplifying the appearance of the mobile terminal 100.

The optical output module 154 can be configured to output light for indicating event generation. Examples of such events include message reception, call signal reception, a missed call, an alarm, a schedule notice, email reception, information reception through an application, and the like. When a user has checked a generated event, the first controller 180 can control the optical output unit 154 to stop light output.

The first camera 121a can process image frames such as still or moving images obtained by the image sensor in a capture mode or a video call mode. The processed image frames can then be displayed on the display 151 or stored in the first memory 170.

The first and second manipulation units 123a and 123b are examples of the user input unit 123, which may be manipulated by a user in order to receive a command for controlling operation of the mobile terminal 100. The first and second manipulation units 123a and 123b may also be commonly referred to as a manipulation portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

Although the first manipulation unit 123a is a touch key in this figure, the present invention is not limited thereto. For example, the first manipulation unit 123a may include a push key (mechanical key) or a combination of a push key and a touch key.

Input received at the first and second manipulation units 123a and 123b may be used in various ways. For example, the first manipulation unit 123a may receive commands such as a menu, home key, cancel, search, or the like, and the second manipulation unit 123b may receive commands for controlling a volume level output from the first or second audio output modules 152a or 152b and switching a touch recognition mode of the display 151.

As another example of the user input unit 123, a rear input unit (not shown) may be located on the rear surface of the terminal body. The rear input unit can be manipulated by a user to receive commands for controlling operation of the mobile terminal 100. The received commands may be set in a variety of different ways. For example, a command such as power on/off, start, end or scroll, a command for controlling a volume level output from the first or second audio output modules 152a or 152b, a command for switching to a touch recognition mode of the display 151, and the like may be received. The rear input unit may be configured to permit touch input, push input, or combinations thereof.

The rear input unit may be located to overlap the display 151 of the front side in a thickness direction of the terminal body. As one example, the rear input unit may be located on an upper end portion of the rear side of the terminal body such that a user can easily manipulate the same using a forefinger when the user grabs the terminal body with one hand. The present invention is not limited thereto and the position of the rear input unit may be changed.

If the rear input unit is provided on the rear surface of the terminal body, a new user interface using the same may be implemented. In addition, the above-described touchscreen or rear input unit may replace at least some of the functions of the first manipulation unit 123a located on the front surface of the terminal body. As such, if the first manipulation unit 123a is not located on the front surface of the terminal body, the display 151 can have a larger screen.

As a further alternative, the mobile terminal 100 may include a finger scan sensor which scans a user's fingerprint. The first controller 180 can then use fingerprint information sensed by the finger scan sensor as part of an authentication procedure. The finger scan sensor may also be installed in the display 151 or implemented in the user input unit 123.

The microphone 122 receives user's voice or the other sounds. If desired, multiple microphones 122 may be provided to receive stereo sound.

The first interface 160 may serve as an interface between the mobile terminal 100 and external devices. For example, the first interface 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The first interface 160 may be implemented in the form of a socket for accommodating an external card, such as a Subscriber Identity Module (SIM), a User Identity Module (UIM), or a first memory card for information storage.

The second camera 121b is located at the rear side of the terminal body and includes an image capturing direction that is substantially opposite to the image capture direction of the first camera unit 121a.

The second camera 121b can include a plurality of lenses arranged along at least one line. The plurality of lenses may also be arranged in a matrix. The cameras may be referred to as an "array camera." When the second camera 121b is implemented as an array camera, images may be captured in various manners using the plurality of lenses, and images with better quality may be acquired.

A flash 124 may be provided adjacent to the second camera 121b. When an image of a subject is captured with the camera 121b, the flash 124 may illuminate the subject.

The second audio output module 152b may be further located on the terminal body. The second audio output module 152b may implement stereophonic sound functions in conjunction with the first audio output module 152a, and may be also used to implement a speakerphone mode for call communication.

At least one antenna for wireless communication may be located on the terminal body. The antenna may be installed in the terminal body or formed in the case. For example, an antenna which configures a part of the broadcast reception module 111 (see FIG. 1a) may be retractable into the terminal body. Alternatively, an antenna may be formed in a film shape to be attached to an inner surface of the rear cover 103, or a case including a conductive material may function as an antenna.

The terminal body includes a power supply (190; see FIG. 1a) for supplying power to the mobile terminal 100. The power supply 190 may include a battery 191, which is mounted in the terminal body or detachably coupled to the outside of the terminal body.

The battery 191 may be configured to receive power via a power source cable connected to the first interface 160. Also, the battery 191 can be recharged in a wireless manner using a wireless charger. Wireless charging may be implemented by magnetic induction or resonance (electromagnetic resonance).

The rear cover 103 is coupled to the rear case 102 to shield the battery 191, to prevent separation of the battery 191, and to protect the battery 191 from external impact or from foreign materials. When the battery 191 is detachable from the terminal body, the rear case 103 may be detachably coupled to the rear case 102.

An accessory for protecting the mobile terminal 100 or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the functionality of the mobile terminal 100. Another example of the accessory is a touch pen for assisting or extending touch input to a touchscreen.

Figure 2:
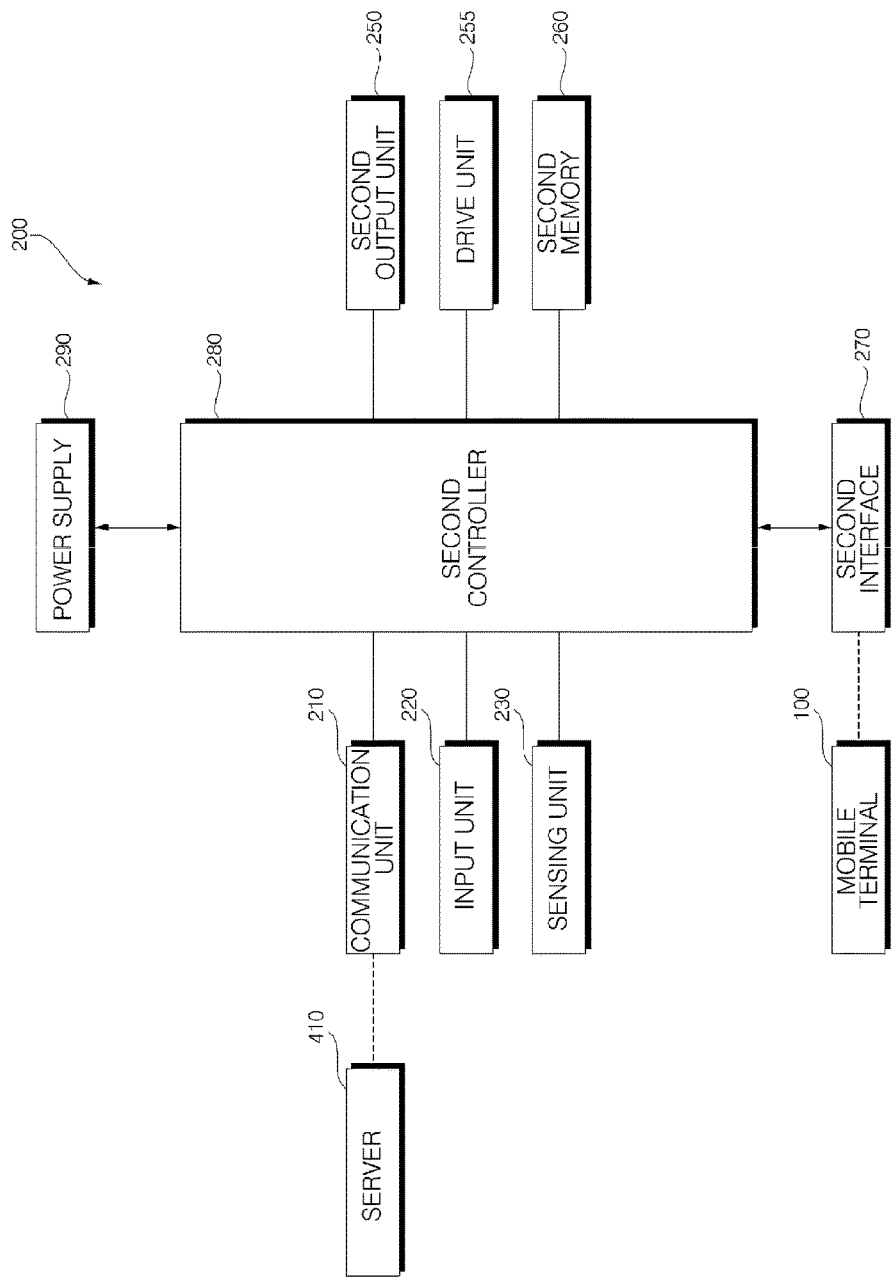
FIG. 2 is a block diagram illustrating a vehicle related to the present invention.

FIG. 2 is a block diagram illustrating a vehicle related to the present invention.

A vehicle 200 as described in this specification may include an automobile and a motorcycle. Hereinafter, an automobile will be focused upon.

A vehicle as described in this specification may include all of a vehicle including an engine, a hybrid vehicle including both an engine and an electric motor, and an electric vehicle including an electric motor. Hereinafter, a vehicle including an engine will be focused upon.

Referring to FIG. 2, the vehicle 200 may include a communication unit 210, an input unit 220, a sensing unit 230, a second output unit 250, a drive unit 255, a second memory 260, a second interface 260, a second controller 280 and a power supply 290.

The communication unit 210 may exchange data with a mobile terminal 100 or an external server 410 in a wireless manner. In particular, the communication unit 210 may be connected to the short-range communication module 114 of the mobile terminal 100 to exchange data according to a short-range communication method.

The communication unit 210 may receive weather information and road traffic state information, e.g., Transport Protocol Experts Group (TPEG) information, from the external server 410. In addition, when the mobile terminal 100 and the vehicle 200 are connected, the communication unit 210 may receive, from the external server 410, a variety of information or data for switching the operating system (OS) of the mobile terminal 100.

The input unit 220 may be included in one area of the vehicle 200, in order to receive user input. The input unit 220 may include a plurality of buttons or a touchscreen. The input unit 220 may receive user input through the plurality of buttons or touchscreen and control various units included in the vehicle 200.

The sensing unit 230 may include various sensors for sensing vehicle speed information, battery information, fuel information, tire information, steering information, vehicle lamp information, vehicle interior temperature information, vehicle interior humidity information, vehicle tilt information, etc.

The second output unit 250 may include a display unit for visually outputting information or data, a sound output unit for audibly outputting information or data or a haptic output unit for outputting information or data in a tactile manner.

In some embodiments, the second output unit 250 may be an audio video navigation (AVN) apparatus.

In some embodiments, the second output unit 250 may be a head up display (HUD) for projecting an image on the windshield of the vehicle 200.

The drive unit 255 may include a lamp drive unit, a steering drive unit, a brake drive unit, a power supply drive unit, a suspension drive unit, etc. in order to drive units for controlling a variety of operations.

The second memory 270 may store a variety of data for operation of the vehicle 20, such as programs, data, control commands, etc. for processing or control of the second controller 280.

The second interface 260 may transmit and receive vehicle driving related information or data or transmit a signal processed or generated by the second controller 280 to an external device. The second interface 260 may be used as an interface with the mobile terminal.

The second controller 280 is connected to each unit included in the vehicle 200 to transmit and receive information, data or signals. The second controller 280 generates and transmits control signals and controls each unit included in the vehicle 200.

The power supply 290 may supply power necessary for operation of each unit under control of the second controller 280.

Figure 3:
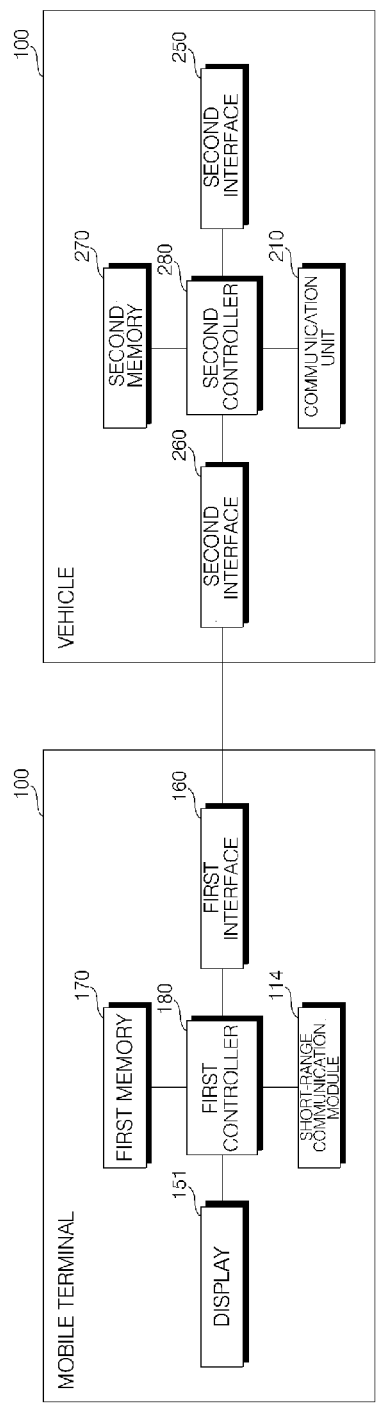
FIG. 3 is a block diagram showing only main components of a mobile terminal and a vehicle according to an embodiment of the present invention.

FIG. 3 is a block diagram showing only main components of a mobile terminal and a vehicle according to an embodiment of the present invention.

Referring to FIG. 3, the mobile terminal 100 may include a short-range communication module 114, a display 151, a first memory 170, a first interface 160 and a first controller 180.

The mobile terminal 100 operates using a first operating system (OS). Here, the first OS is system software for providing a hardware abstraction platform and a common system service in order to manage hardware of the mobile terminal 100 and to execute application software. Examples of smartphone OSs include Android of Google, iOS of Apple, Symbian of Nokia, Blackberry OS of RIM, Windows phone of Microsoft, etc.

The mobile terminal 100 operates as an agent upon connection with the vehicle 200. Here, the agent may be a device or system for performing operations in place of the user or the vehicle 200, for a specific purpose. For example, when the mobile terminal 100 and the vehicle are connected, the passenger of the vehicle may control the vehicle 200 through the mobile terminal 100. In this case, the mobile terminal 100 may be referred to as an agent.

The short-range communication module 114 communicates with the vehicle 200. Although Bluetooth is representatively used as an available communication method, RFID, infrared communication, UWB, ZigBee, NFC, Wi-Fi, Wi-Fi Direct, Wireless USB, etc. may also be used. Although the mobile terminal 100 and the vehicle 200 are connected through the first interface 160 and the second interface 260 to transmit and receive data in the following embodiments, the present invention is not limited thereto. That is, the mobile terminal 100 and the vehicle 200 may be connected through the short-range communication module 114 and the communication unit 210 to transmit and receive data.

The display 151 displays (outputs) information processed by the mobile terminal 100. For example, the display 151 may display execution screen information of an application program executed in the mobile terminal 100 or information on a user interface (UI) or graphical user interface (GUI) according to such execution screen information.

When the mobile terminal 100 is connected to the vehicle 200, the display 151 may display information received from the vehicle 200. The display 151 may have an inter-layered structure or an integrated structure with a touch sensor in order to realize a touchscreen. In this case, the display 151 may receive user input based on information received from the vehicle 200. At this time, the first controller 180 may control the vehicle 200 according to user input received by the display 151.

When the OS of the mobile terminal 100 is switched from the first OS to the second OS in a state in which the mobile terminal 100 is connected to the vehicle 200, the display 151 displays OS switching information. Here, the second OS may be different from the first OS and dedicated to the vehicle. For example, the second OS may be system software for providing a hardware abstraction platform and a common system service in order to execute a vehicle application. At this time, the display 151 performs a function corresponding to the information display of the present invention.

The first memory 170 stores data of a plurality of applications. Here, the plurality of applications includes a vehicle application or a vehicle safety related application. For example, the first memory 170 may store data of a navigation application, a black box application, a trip log application, an emergency call (E-call) application, a vehicle log application and a maintenance history application.

One mobile terminal 100 may be connected to a plurality of vehicles 200. At this time, the first memory 170 may distinguishably store information on each of the plurality of vehicles. For example, when the mobile terminal 100 is connected to a first vehicle 200a, the mobile terminal 100 may receive information on the first vehicle 200a from the first vehicle 200a. In addition, when the mobile terminal 100 is connected to a second vehicle 200b, the mobile terminal 100 may receive information on the second vehicle 200b from the second vehicle 200b. At this time, the first memory 170 may distinguishably store the information on the first vehicle 200a and the information on the second vehicle 200b.

Here, the information on the plurality of vehicles 200a and 200b may include at least one of vehicle ID, refueling history, mileage, gas mileage, remaining fuel and maintenance history of the vehicle 200.

The first memory 170 may store ID information of the vehicle 200. For example, when the mobile terminal 100 is connected to the first vehicle 200a, the first controller 180 receives ID information from the first vehicle 200a and determines whether the received ID information matches the ID information of the vehicle 200 stored in the first memory 170 through comparison. If the ID information of the vehicle matches, the mobile terminal 100 may operate as an agent. That is, if the ID information of the vehicle matches, the user may control the vehicle 200 through the mobile terminal 100. At this time, the first controller 180 performs a function corresponding to a first determination unit of the present invention.

The first memory 170 may store vehicle driving information or user driving habit information collected from when the vehicle 200 is connected to when vehicle driving is completed, when vehicle driving is completed after connection with the vehicle 200. Here, information regarding whether vehicle driving has been completed may be received from the vehicle 200.

The first memory 170 may store the second OS. In some embodiments, when the mobile terminal 100 is connected to the vehicle 200, the OS may be switched from the first OS to the second OS. Here, the second OS may be received from the vehicle 200 through the first interface 160.

The first interface 160 serves as an interface with the vehicle 200 connected to the mobile terminal 100. The first interface 160 may be compatible with the plurality of vehicles 200. The first interface 160 may be connected to the second interface 270a of the first vehicle 200a. In addition, the first interface 160 may be connected to the second interface 270b of the second vehicle 200b.

In some embodiments, the first interface 160 may receive the second OS from the vehicle 200. The second memory 270 of the vehicle 200 may store the second OS and the first interface 160 may receive the second OS through connection with the second interface 260. Here, as described above, the second OS is different from the first OS and is dedicated to the vehicle 200. The first controller 180 may switch the OS of the mobile terminal 100 from the first OS to the received second OS. At this time, the first interface 160 performs a function corresponding to the reception unit of the present invention, the second memory 270 performs a function corresponding to the memory of the present invention, and the first controller 180 performs a function corresponding to the switching unit of the present invention.

The first controller 180 controls operation of each unit included in the mobile terminal 100.

The first controller 180 may switch the OS from the first OS to the second OS when the mobile terminal 100 and the vehicle 200 are connected. In this case, the first controller 180 may switch the OS when user input is received in a state of being connected to the vehicle 200. At this time, user input may be touch input received through the display 151.

For example, when the mobile terminal 100 and the vehicle 200 are connected, the first controller 180 receives the second OS through the first interface 160. At this time, the first controller 180 switches the first OS to the received second OS. As another example, when the mobile terminal 100 and the vehicle 200 are connected, the first controller 180 switches the first OS to the second OS stored in the first memory 170.

Meanwhile, the mobile terminal 100 operates using the first OS in a state in which the mobile terminal is not connected to the vehicle 200. When the mobile terminal 100 operates using the first OS even in a state of being connected to the vehicle 200, data of the mobile terminal 100 and data related to the vehicle 200 should be simultaneously processed, thereby causing overload. Accordingly, when the mobile terminal 100 is connected to the vehicle 200, the OS of the mobile terminal 100 is switched from the first OS to the second OS, thereby preventing overload. For example, it is possible to prevent the system from being stopped due to overload to ensure safe driving of the vehicle 200.

The first controller 180 may switch the OS from the second OS to the first OS, when driving of the vehicle 200 is completed after connection with the vehicle 200. For example, when the mobile terminal 100 is connected to the vehicle 200, the first controller 180 may switch the OS from the first OS to the second OS and transmit the first OS to the vehicle 200 through the first interface 160. The second controller 280 included in the vehicle 200 may store the first OS in the second memory 270.

Thereafter, when driving of the vehicle 200 is completed, the first controller 180 may receive the first OS through the first interface 160 and switch the OS of the mobile terminal 100 from the second OS to the first OS.

In general, the data capacity of the OS may be too large to store two OSs in the first memory 170. In this case, the first controller 180 may appropriately switch an OS required for the mobile terminal 100 and transmit an unnecessary OS to the vehicle 200, thereby efficiently managing the first memory 170.

When the mobile terminal 100 is connected to the vehicle 200, the first controller 180 may perform control to execute only applications related to the vehicle 200 among a plurality of applications installed in the mobile terminal 100. For example, if the mobile terminal 200 operates using the second OS, the first controller 180 may perform control to deactivate applications unrelated to the vehicle 200 and to execute only applications related to the vehicle 200.

By executing only the applications related to the vehicle 200, it is possible to reduce burdens on data processing and storage and to prevent overload. For example, it is possible to prevent the system from being stopped due to overload to ensure safe driving of the vehicle 200.

When the mobile terminal 100 is connected to the vehicle 200, the first controller 180 may perform control to preferentially execute a safety related application of the vehicle 200 among the plurality of applications installed in the mobile terminal 100. For example, if the mobile terminal 200 operates using the second OS, the first controller 180 may perform control to deactivate applications unrelated to the vehicle 200 and to execute only applications related to the vehicle 200. In particular, the first controller 180 may perform control to preferentially execute the safety related application of the vehicle 200 among the applications related to the vehicle 200.

By executing only the safety related applications of the vehicle 200, it is possible to reduce burdens on data processing and storage and to prevent overload. For example, it is possible to prevent the system from being stopped due to overload to ensure safe driving of the vehicle 200.

When the mobile terminal 100 is connected to the vehicle 200, the first controller 180 determines whether the ID information of the vehicle 200 received through the first interface 160 matches the ID information stored in the first memory 170. If the ID information matches, the mobile terminal 100 may operate as an agent.

Meanwhile, when the OS is switched from the first OS to the second OS in a state in which the mobile terminal 100 is connected to the vehicle 200, an application, which has operated using the first OS, may not be operate using the second OS. In this case, the first controller 180 may install an application patch in order to execute an already installed application even using the second OS. For example, if the application patch needs to be installed, the first controller 180 may output a message regarding whether the patch is installed through the display 151. If a patch installation command is received through user touch input, the first controller 180 receives the patch from the external server through the communication unit 100. Thereafter, the first controller 180 installs the received patch. At this time, the first controller 180 performs a function corresponding to a patch installation unit of the present invention.

The vehicle 200 includes a communication unit 210, a second output unit 250, a second memory 270, a second interface 260 and a second controller 280.

The communication unit 210 may transmit and receive data to and from the mobile terminal 100, an external server (not shown) or another vehicle. For example, the communication unit 210 may be connected to the short-range communication module 114 of the mobile terminal 100 to transmit and receive data. For example, when a traffic accident occurs, the second controller 280 may transmit traffic accident information to a server managed by a management center through the communication unit 210.

The second output unit 250 may include a video output unit, an audio output unit or a tactile output unit. The second output unit 250 outputs information processed by the vehicle 200. When the vehicle 200 is connected to the mobile terminal 100, the second output unit 250 may output information received by the mobile terminal 100. The video output unit (not shown) may have an inter-layered structure or an integrated structure with a touch sensor in order to realize a touchscreen.

When the OS of the mobile terminal 100 is switched from the first OS to the second OS in a state in which the vehicle 200 is connected to the mobile terminal 100, the video output unit (not shown) may display OS switching information.

The second memory 270 may store the second OS. When the vehicle 200 is connected to the mobile terminal 100, the second controller 280 transmits the second OS to the mobile terminal 100.

When the OS of the mobile terminal 100 is switched from the first OS to the second OS after the vehicle 200 is connected to the mobile terminal 100, the second controller 280 may receive the first OS from the mobile terminal 100. In this case, the second memory 270 stores the first OS. That is, the second memory 160 may back the first OS up. When the OS of the mobile terminal 100 is switched, the second memory 270 may store the first OS to efficiently manage the first memory 170 of the mobile terminal 100.

Meanwhile, a plurality of mobile terminals 100 may be connected to one vehicle 200. At this time, the second memory 270 may distinguishably store information on the plurality of mobile terminals. For example, when the vehicle 200 is connected to the first mobile terminal 100*a*, the vehicle 200 may receive information on a first mobile terminal 100*a* from the first mobile terminal 100*a*. In addition, when the vehicle 200 is connected to the second mobile terminal 100*b*, the vehicle 200 may receive information on the second mobile terminal 100*b* from the second mobile terminal 100*b*. At this time, the second memory 270 may distinguishably store the information on the first mobile terminal 100*a* and the information on the second mobile terminal 100*b*.

Here, the information on the plurality of mobile terminals 100*a* and 100*b* may be past vehicle driving information or driving habit information stored in the mobile terminal 100.

The second memory 270 may store the ID information of the mobile terminal 100. For example, when the vehicle 200 is connected to the first mobile terminal 100*a*, the second controller 280 receives ID information from the first mobile terminal 100*a* and determines whether the received ID information matches the ID information of the mobile terminal 100 stored in the second memory 270 through comparison. If the ID information of the mobile terminal 100 matches, the mobile terminal 100 may operate as an agent. That is, if the ID information of the mobile terminal 100 matches, the user may control the vehicle 200 through the mobile terminal 100. At this time, the second controller 280 performs a function corresponding to a second determination unit of the present invention.

The second memory 270 may store vehicle driving information or user driving habit from when the vehicle 200 is connected to when vehicle driving is completed, when vehicle driving is completed after connection with the mobile terminal 100. Here, the vehicle driving information may include mileage, average driving speed, remaining fuel or average gas mileage. The driving habit information may include speeding, whether a traffic sign is violated or whether a speed is reduced upon traveling on a curved road.

Meanwhile, whether driving of the vehicle 200 has been completed may be determined depending on whether the vehicle is turned off, whether the vehicle 200 is not accelerated after the vehicle 200 is stopped, whether a gear is in Park (P) or whether a parking brake is engaged.

The second interface 260 serves as an interface with the mobile terminal 100 connected to the vehicle 200. That is, the second interface 260 serves as a passage to allow data to be transmitted and received to and from the mobile terminal 100. The second interface 260 may be compatible with a plurality of mobile terminals 100. The second interface 260 may be connected to the first interface 170*a* of the first mobile terminal 100*a*. In addition, the second interface 260 may be connected to the second interface 270*b* of the second mobile terminal 100a. Here, the second interface may perform a function corresponding to a transceiver of the present invention.

In some embodiments, the second interface 260 may transmit the second OS stored in the second memory 270 to the mobile terminal 100.

The second interface 260 includes a connector, a cradle, a cooler and a charger. In some embodiments, the connector and the charger may be integrally configured.

The connector may include a connection port of the mobile terminal 100. At this time, the connection port may be formed to be compatible with a plurality of different types of mobile terminals 100.

Each of the plurality of different types of mobile terminals 100 may be compatibly mounted on the cradle.

The cooler prevents the mobile terminal 100 from overheating. For example, the cooler includes at least one fan and may prevent the mobile terminal 100 from overheating according to rotation of the fan. For example, the cooler may prevent the mobile terminal 100 from overheating using the air conditioner of the vehicle 200.

The charger supplies power to the mobile terminal 100. The charger may supply power from a battery used to drive the vehicle 200 to the mobile terminal 100.

The second controller 280 controls operation of each unit included in the vehicle 200. The second controller 280 may control the second interface 260 to transmit the second OS to the mobile terminal 100 when the vehicle 200 is connected to the mobile terminal 100.

When the vehicle 200 is connected to the mobile terminal 100, the second controller 280 determines whether the ID information of the mobile terminal 100 received through the second interface 260 matches ID information stored in the second memory 270. If the ID information matches, the mobile terminal 100 may operate as an agent.

If the vehicle 200 is connected to the mobile terminal 100, the second controller 280 transmits the second OS to the mobile terminal 100. In this case, the first controller 180 switches the OS of the mobile terminal 100 from the first OS to the second OS. Thereafter, the second controller 280 may receive the first OS from the mobile terminal 100 through the second interface 260 and store the first OS in the second memory 270.

Figure 4:
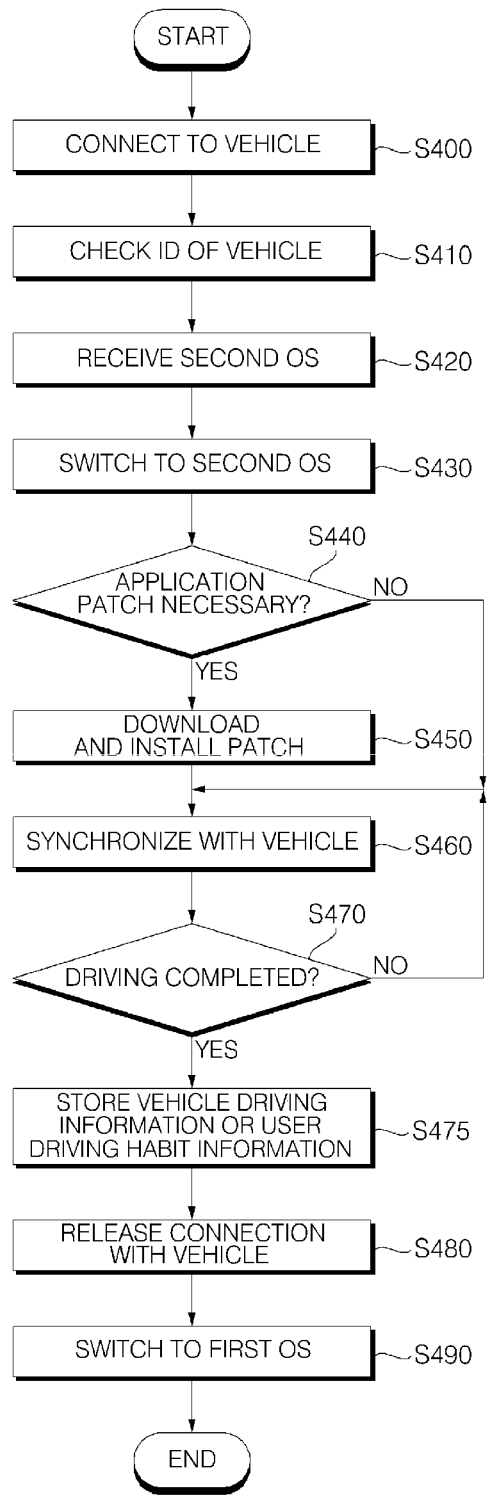
FIG. 4 is a flowchart illustrating operation of a mobile terminal according to an embodiment of the present invention.

FIG. 4 is a flowchart illustrating operation of a mobile terminal according to an embodiment of the present invention.

Referring to FIG. 4, when the first interface 160 and the second interface 260 are connected, the first controller 180 establishes connection with the vehicle 200 (S400). Although connection with the vehicle 200 is established through the first interface 160 in this embodiment, the mobile terminal 100 may be connected to the vehicle 200 through the short-range communication module 114.

When the mobile terminal 100 is connected to the vehicle 200, the first controller 180 receives the ID information of the vehicle 200 through the first interface 160 and determines whether the received ID information of the vehicle 200 matches the ID information of the vehicle 200 stored in the first memory 170 (S410). If the ID information matches, the mobile terminal 100 may operate as an agent.

If the ID information of the vehicle is confirmed, the first controller 180 receives the second OS through the first interface 160 (S420). Here, the second OS is different from the first OS and is dedicated to the vehicle 200.

In a state of receiving the second OS, the first controller 180 switches the OS of the mobile terminal 100 from the first OS to the second OS (S430). Here, the first OS is system software for providing a hardware abstraction platform and a common system service in order to manage hardware of the mobile terminal 100 and to execute application software.

In a state in which the OS of the mobile terminal 100 is switched from the first OS to the second OS, the first controller 180 determines whether an application patch is necessary (S440).

If the patch is necessary, the first controller 180 downloads and installs the patch from an external server (S450). When the OS is switched from the first OS to the second OS in a state in which the mobile terminal 100 is connected to the vehicle 200, the application, which has operated using the first OS, may not operate using the second OS. In this case, the first controller 180 may install the application patch in order to operate the existing application using the second OS. For example, if the application patch needs to be installed, the first controller 180 may output a message regarding whether the patch is installed through the display 151. When a patch installation command is received through user touch input, the first controller 180 receives the patch from the external server through the wireless communication unit 110. Thereafter, the first controller 180 installs the received patch.

Upon installing the patch, the first controller 180 performs control to perform synchronization with the vehicle 200 (S460). For example, the first controller 180 may receive user input and transmit a control signal for controlling the vehicle 200. In addition, the first controller 180 may receive and output a variety of information or data from the vehicle 200. In addition, the first controller 180 may store the generated information or data in the first memory 170 in a state in which the mobile terminal 100 is connected to the vehicle 200.

When vehicle driving is completed, the first controller 180 stores, in the first memory 170, vehicle driving information or user driving habit information collected from when the mobile terminal 100 is connected to the vehicle 200 to when driving is completed (S470 and S475). Meanwhile, whether driving of the vehicle 200 has been completed may be determined depending on whether the vehicle is turned off, whether the vehicle 200 is not accelerated after the vehicle 200 is stopped, whether a gear is in Park (P) or whether a parking brake is engaged. The first controller 180 may receive driving complete information from the vehicle 200.

Thereafter, the first controller 180 releases connection with the vehicle 200 (S480).

When connection with the vehicle 200 is released, the first controller 180 switches the OS from the second OS to the first OS (S490).

Figure 5:
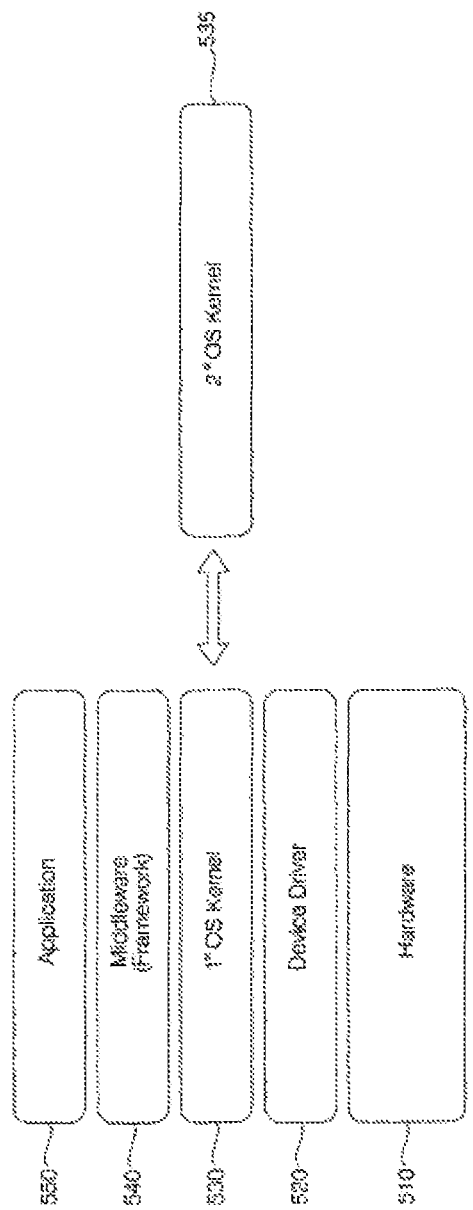
FIG. 5 is a view referred to for describing architecture of a mobile terminal according to an embodiment of the present invention.

FIG. 5 is a view referred to for describing architecture of a mobile terminal according to an embodiment of the present invention.

The architecture of the mobile terminal 100 may include hardware 510, a device driver 520, an OS kernel 530, middleware 540 and an application 550.

The hardware 510 includes a central processing unit (CPU), a read only memory (ROM), a random access memory (RAM), various input/output devices, various communication devices, etc.

The device driver 520 is disposed between the hardware 510 and the OS kernel 530. The device driver 520 is software for handling and managing hardware. The device driver 520 is a program for connecting hardware, an OS and an application program and is necessary to operate hardware components using the OS. The device driver 520 is used to directly write or control data on an application program using hardware.

The OS kernel 530 is disposed between the device driver 520 and the middleware 540. The OS kernel 530 serves as an interface between the hardware 510 and the application program. The OS kernel 530 manages resources of a CPU, a main memory unit and an input/output device. That is, the OS kernel provides interaction between a user and the mobile terminal 100, boots the mobile terminal 100, determines the order of operations and controls input/output operation. In addition, the OS kernel 530 controls program execution and manages storage of data and files.

The OS kernel 530 may include the first OS and the second OS.

The middleware 540 means a programming service for mediation between two or more systems or programs. The middleware 540 is located in a middle region of the OS kernel 530 and the application 550. The middleware 540 includes any one of database middleware, online transaction processing (LTP) middleware and object-oriented middleware.

The application 550 is located on the middleware 540. The application 550 includes various application programs. For example, the application 550 may include a navigation application, a black box application, a trip log application, an emergency call (E-call) application, a vehicle log application and a maintenance history application.

According to the embodiment of the present invention, when the mobile terminal 100 and the vehicle 200 are connected, the first OS is switched to the second OS at an OS kernel level. In addition, when connection between the mobile terminal 100 and the vehicle 200 is released, the second OS is switched to the first OS at the OS kernel level.

Figure 6A:
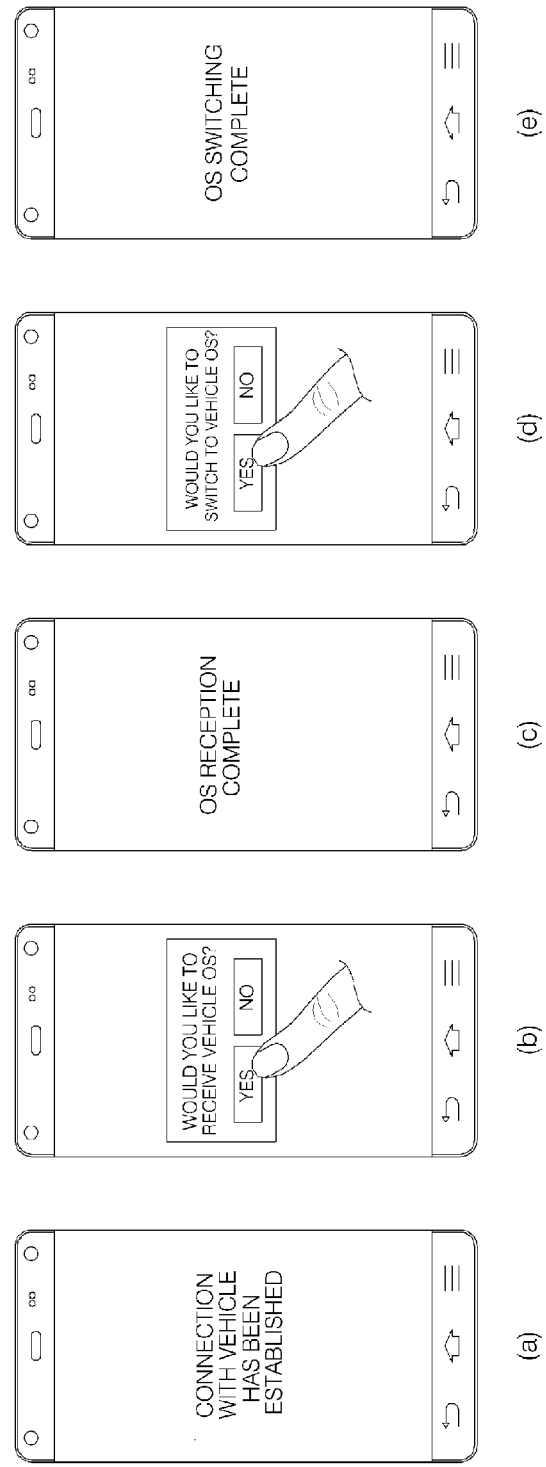
FIGS. 6a to 6b are views referred to for describing operation of switching an operating system (OS) of a mobile terminal to a vehicle OS according to an embodiment of the present invention.
Figure 6B:
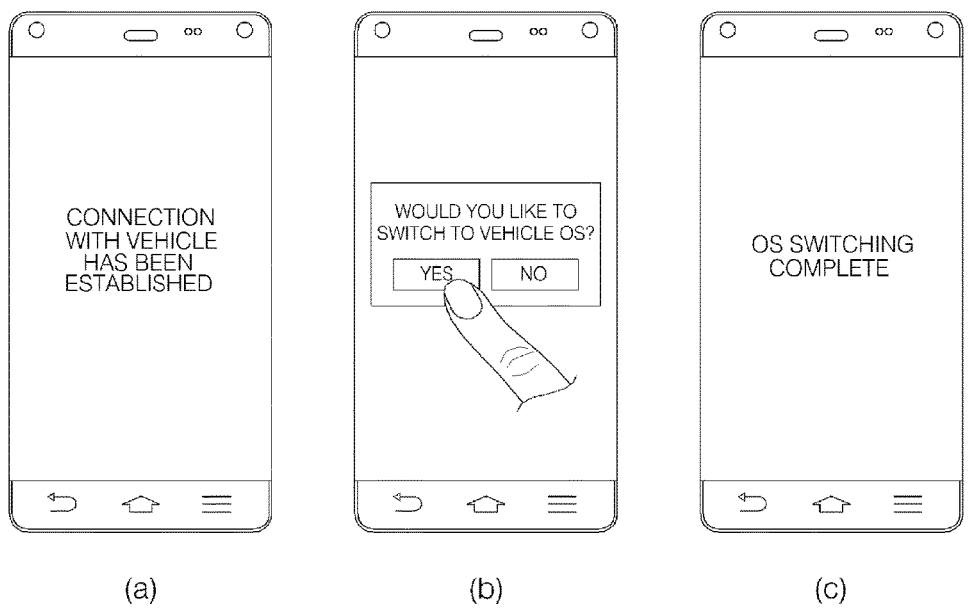

FIGS. 6a to 6b are views referred to for describing operation of switching an operating system (OS) of a mobile terminal to a vehicle OS according to an embodiment of the present invention.

FIG. 6a shows the case where the second OS is received from the vehicle 200.

As shown in (a) of FIG. 6a, when the mobile terminal 100 is connected to the vehicle 200, the first controller 180 displays a message indicating connection with the vehicle 200 through the display 151. Meanwhile, the first controller 180 receives the ID information of the vehicle 200 and determines whether the received ID information matches the ID information of the vehicle 200 stored in the first memory 170. If the ID information matches, the mobile terminal 100 may operate as an agent.

Thereafter, as shown in (b) of FIG. 6a, the first controller 180 displays a message to check whether the second OS has been received.

When a second OS reception command is generated according to user touch input, the first controller 180 receives the second OS through the first interface 160.

When reception of the second OS is completed, as shown in (c) of FIG. 6, the first controller 180 displays a message indicating that reception of the second OS has been completed on the display 151.

Thereafter, as shown in (d) of FIG. 6a, the first controller 180 displays a message to check whether the OS has been switched from the first OS to the second OS.

When an OS switching command is generated according to user touch input, the first controller 180 switches the OS of the mobile terminal 100 from the first OS to the second OS.

When switching is completed, as shown in (e) of FIG. 6a, the first controller 180 displays an OS switching complete message on the display 151.

Although user touch input is described in this embodiment, the first controller 180 may receive user voice input through the microphone 122 and perform control according to user voice input. In addition, the first controller 180 may audibly output the message displayed on the display 150 through the audio output unit 152.

FIG. 6b shows the case where the second OS is stored in the first memory 170.

As shown in (a) of FIG. 6b, when the mobile terminal 100 is connected to the vehicle 200, the first controller 180 displays a message indicating connection with the vehicle 200 through the display 151.

Thereafter, as shown in (b) of FIG. 6b, the first controller 180 displays a message to check whether the OS has been switched from the first OS to the second OS. In some embodiments, the second OS may be already stored in the first memory 170.

When an OS switching command is generated according to user touch input, the first controller 180 switches the OS of the mobile terminal 100 from the first OS to the second OS.

When switching is completed, as shown in (c) of FIG. 6b, the first controller 180 displays an OS switching complete message on the display 151.

Although user touch input is described in this embodiment, the first controller 180 may receive user voice input through the microphone 122 and perform control according to user voice input. In addition, the first controller 180 may audibly output the message displayed on the display 150 through the audio output unit 152.

Figure 7:
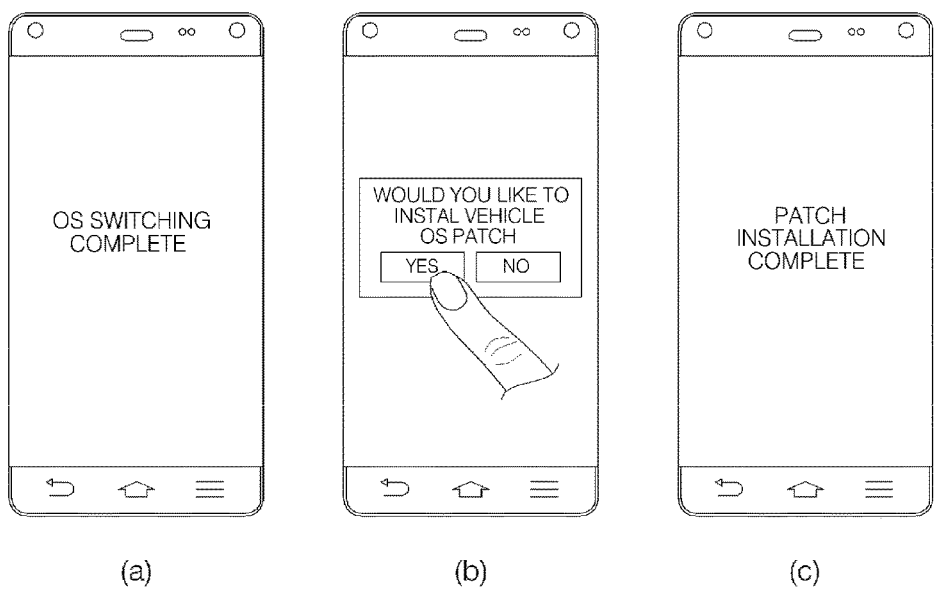
FIG. 7 is a view referred to for describing operation of installing a vehicle OS patch upon switching a vehicle OS according to an embodiment of the present invention.

FIG. 7 is a view referred to for describing operation of installing a vehicle OS patch upon switching a vehicle OS according to an embodiment of the present invention.

As shown in (a) of FIG. 7, when OS switching is completed, the first controller 180 displays an OS switching complete message.

When a patch needs to be installed in a state in which OS switching is completed in order to execute an already installed application, as shown in (b) of FIG. 7, the first controller 180 displays a message to check whether an application for the second OS has been installed on the display 151.

When a patch installation command is generated according to user touch input, the first controller 180 receives the patch from the external server for providing the patch through the wireless communication unit 110. Thereafter, the first controller 180 installs the received patch.

If patch installation is completed, as shown in (c) of FIG. 7, the first controller 180 displays a patch installation complete message on the display 151.

Although user touch input is described in this embodiment, the first controller 180 may receive user voice input through the microphone 122 and perform control according to user voice input. In addition, the first controller 180 may audibly output the message displayed on the display 150 through the audio output unit 152.

Figure 8A:
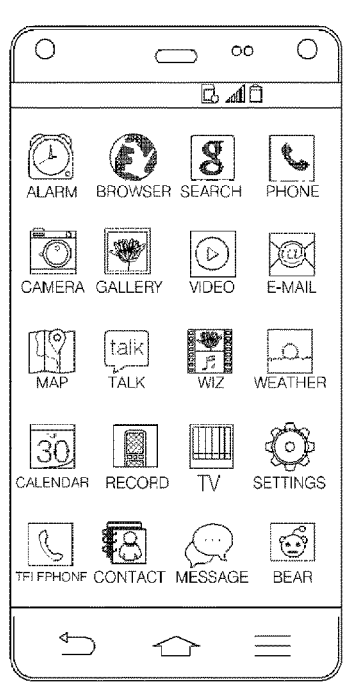
FIG. 8a is a view referred to for describing operation of performing control to execute only vehicle applications when a mobile terminal and a vehicle are connected, according to an embodiment of the present invention.
Figure 8A:
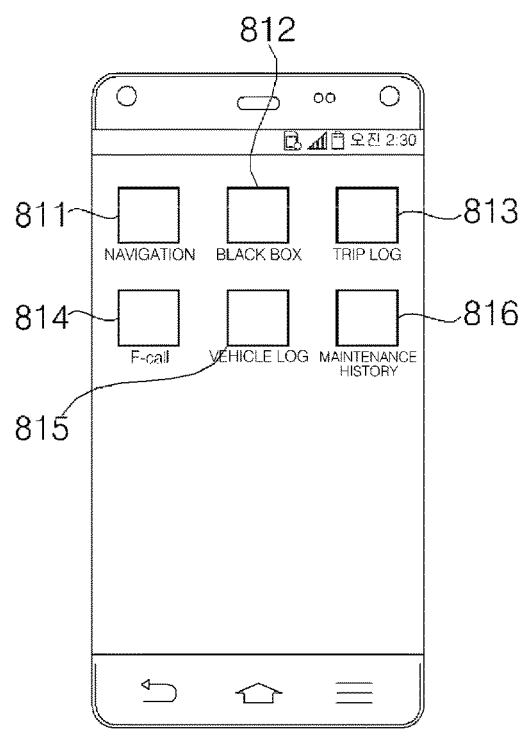

FIG. 8a is a view referred to for describing operation of performing control to execute only vehicle applications when a mobile terminal and a vehicle are connected, according to an embodiment of the present invention.

As shown in (a) of FIG. 8a, a plurality of applications is installed in the mobile terminal 100. The mobile terminal

100 displays icons corresponding to the installed applications in a state of displaying a home screen on the display 151.

When the mobile terminal 100 is connected to the vehicle 200, the first controller 180 performs control to execute only applications related to the vehicle 200 among the plurality of applications installed in the mobile terminal 100. The first controller 180 deactivates applications unrelated to the vehicle 200. At this time, as shown in (b) of FIG. 8a, the first controller 180 displays icons corresponding to the applications related to the vehicle 200 on the display 151. In this embodiment, the first controller 180 displays icons 811 to 816 corresponding to the navigation application, the black box application, the trip log application, the emergency call (E-call) application, the vehicle log application and the maintenance history application on the display 151.

At this time, the first controller 180 performs a function corresponding to the application drive unit of the present invention.

When the mobile terminal 200 is connected to the vehicle 200, only the applications related to the vehicle 200 are executed. Therefore, it is possible to reduce burdens on data processing and storage and to prevent overload. For example, it is possible to prevent the system from being stopped due to overload to ensure safe driving of the vehicle 200.

Figure 8B:
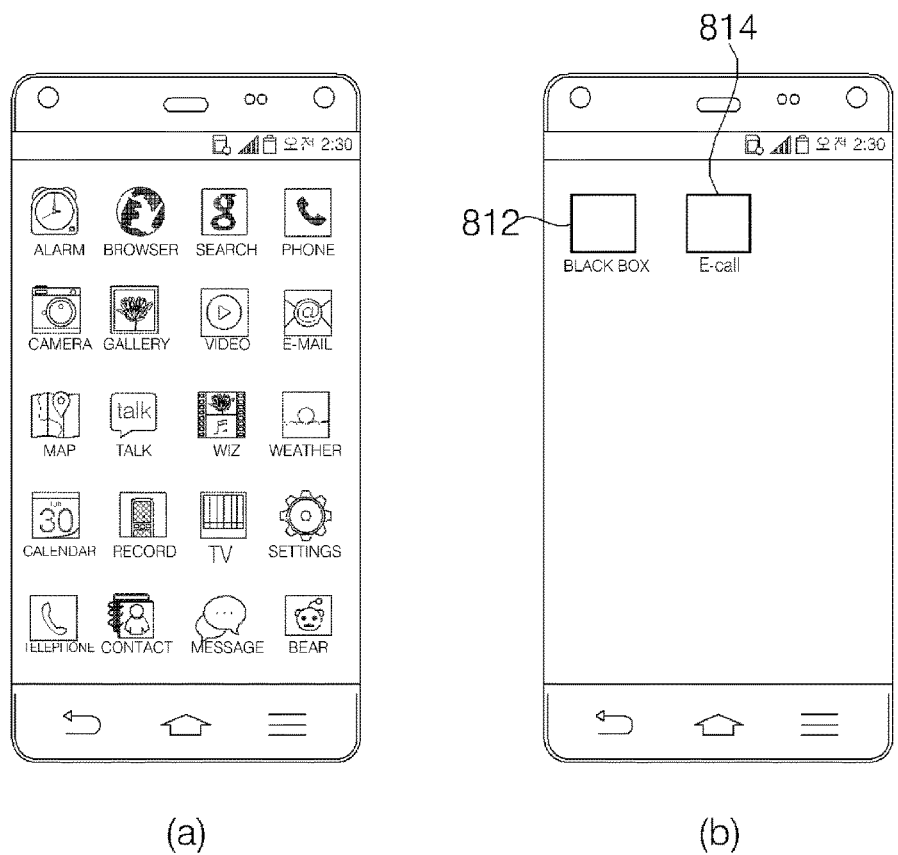
FIG. 8b is a view referred to for describing operation of performing control to preferentially execute only vehicle safety related applications when a mobile terminal and a vehicle are connected, according to an embodiment of the present invention.

FIG. 8b is a view referred to for describing operation of performing control to first execute only vehicle safety related applications when a mobile terminal and a vehicle are connected, according to an embodiment of the present invention.

As shown in (a) of FIG. 8b, a plurality of applications is installed in the mobile terminal 100. The mobile terminal 100 displays icons corresponding to the installed applications in a state of displaying a home screen on the display 151.

When the mobile terminal 100 is connected to the vehicle 200, the first controller 180 performs control to preferentially execute applications related to safety of the vehicle 200 among the plurality of applications installed in the mobile terminal 100. The first controller 180 deactivates applications unrelated to safety of the vehicle 200. At this time, as shown in (b) of FIG. 8b, the first controller 180 displays icons corresponding to the applications related to the vehicle 200 on the display 151.

In this embodiment, the first controller 180 displays icons 812 and 814 corresponding to the black box application and the E-call application on the display 151.

At this time, the first controller 180 performs a function corresponding to the application drive unit of the present invention.

By executing only the application related to safety of the vehicle 200, it is possible to reduce burdens on data processing and storage and to prevent overload. For example, it is possible to prevent the system from being stopped due to overload to ensure safe driving of the vehicle 200.

Figure 9:
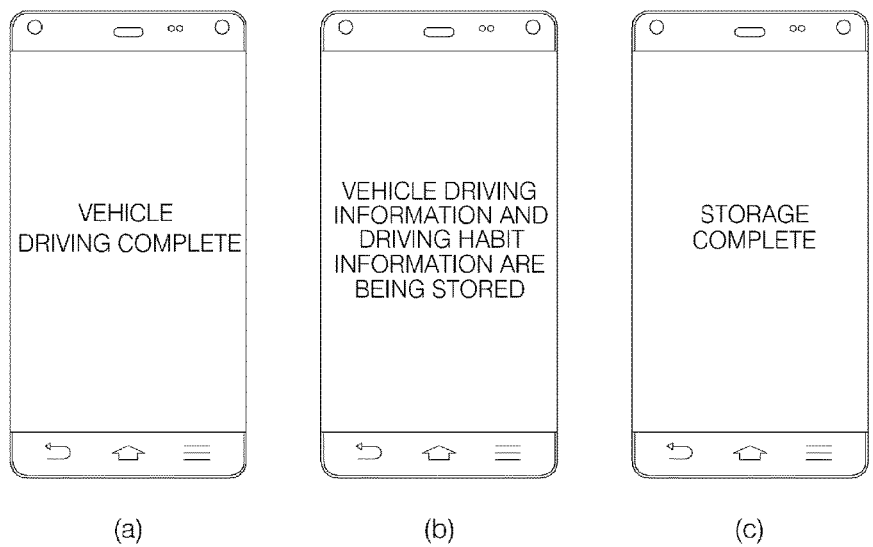
FIG. 9 is a view referred to for describing operation of storing vehicle driving information or driving habit information when vehicle driving is completed after a mobile terminal and a vehicle are connected, according to an embodiment of the present invention.

FIG. 9 is a view referred to for describing operation of storing vehicle driving information or driving habit information when vehicle driving is completed after a mobile terminal and a vehicle are connected, according to an embodiment of the present invention.

As shown in (a) of FIG. 9, when driving of the vehicle 200 is completed, the first controller 180 displays a message indicating that driving of the vehicle 200 has been completed on the display 151.

Whether driving of the vehicle 200 has been completed may be determined depending on whether the vehicle is turned off, whether the vehicle 200 is not accelerated after the vehicle 200 is stopped, whether a gear is in Park (P) or whether a parking brake is engaged. The first controller 180 may receive driving complete information from the vehicle 200.

Thereafter, the first controller 180 stores, in the first memory 170, vehicle driving information or user driving habit information collected from when the vehicle 200 is connected to when vehicle driving is completed. While the vehicle driving information or the user driving habit information is stored in the first memory 170, as shown in (b) of FIG. 9, a message indicating that the information is being stored is displayed on the display 151. If storage is completed, as shown in (c) of FIG. 9, a storage complete message is displayed on the display 151.

Figure 10:
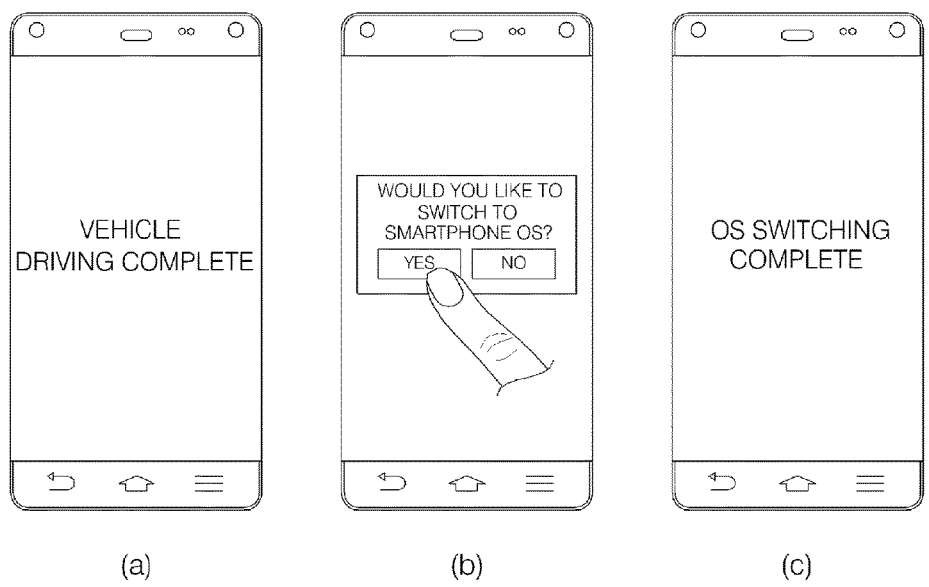
FIG. 10 is a view referred to for describing operation of switching to an OS of a mobile terminal when vehicle driving is completed after a mobile terminal and a vehicle are connected, according to an embodiment of the present invention.

FIG. 10 is a view referred to for describing operation of switching to an OS of a mobile terminal when vehicle driving is completed after a mobile terminal and a vehicle are connected, according to an embodiment of the present invention.

As shown in (a) of FIG. 10, when driving of the vehicle 200 is completed, the first controller 180 displays a message indicating that driving of the vehicle 200 has been completed on the display 151.

When connection between the mobile terminal 100 and the vehicle 200 is released in a state in which driving of the vehicle 200 is completed, as shown in (b) of FIG. 10, the first controller 180 displays an OS switching confirmation message on the display 151.

When an OS switching command is generated according to user touch input, the first controller 180 switches the OS of the mobile terminal 100 from the second OS to the first OS.

When switching is completed, as shown in (c) of FIG. 10, the first controller 180 displays an OS switching complete message on the display 151.

Although user touch input is described in this embodiment, the first controller 180 may receive user voice input through the microphone 122 and perform control according to user voice input. In addition, the first controller 180 may audibly output the message displayed on the display 150 through the audio output unit 152.

Figure 11A:
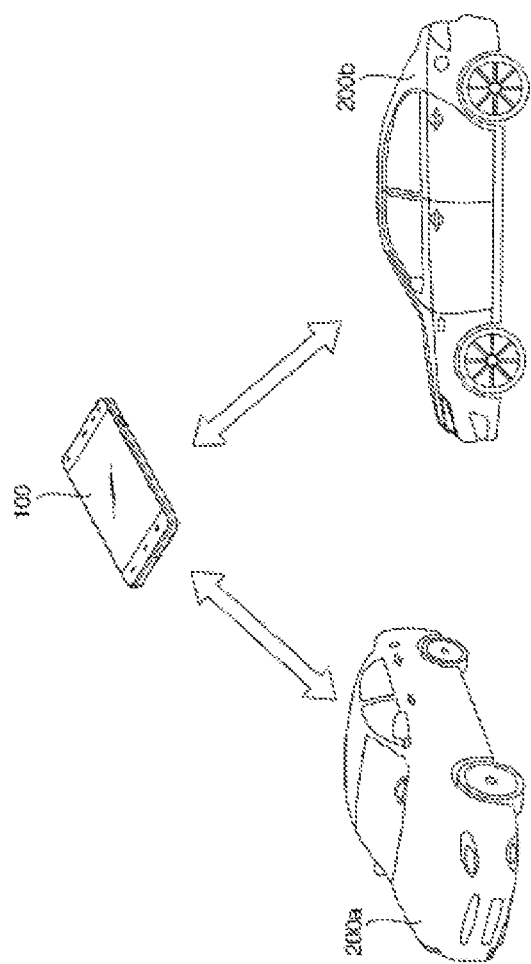
FIG. 11a is a view referred to for describing connection of one mobile terminal to a plurality of vehicles according to an embodiment of the present invention.

FIG. 11a is a view referred to for describing connection of one mobile terminal to a plurality of vehicles according to an embodiment of the present invention.

Referring to FIG. 11a, if a user has a plurality of vehicles 200a and 200b, the user of the mobile terminal 100 may use the plurality of vehicles 200a and 200b.

In this case, the mobile terminal 100 may be connected to the first vehicle 200a to transmit and receive information or data including the OS. In addition, the mobile terminal 100 may be connected to the second vehicle 200b to transmit and receive information or data including the OS.

When the mobile terminal 100 is connected to the vehicle 200, the first controller 180 may determine to which vehicle the mobile terminal is connected, through the ID information received from the vehicle 200a or 200b.

Figure 11B:
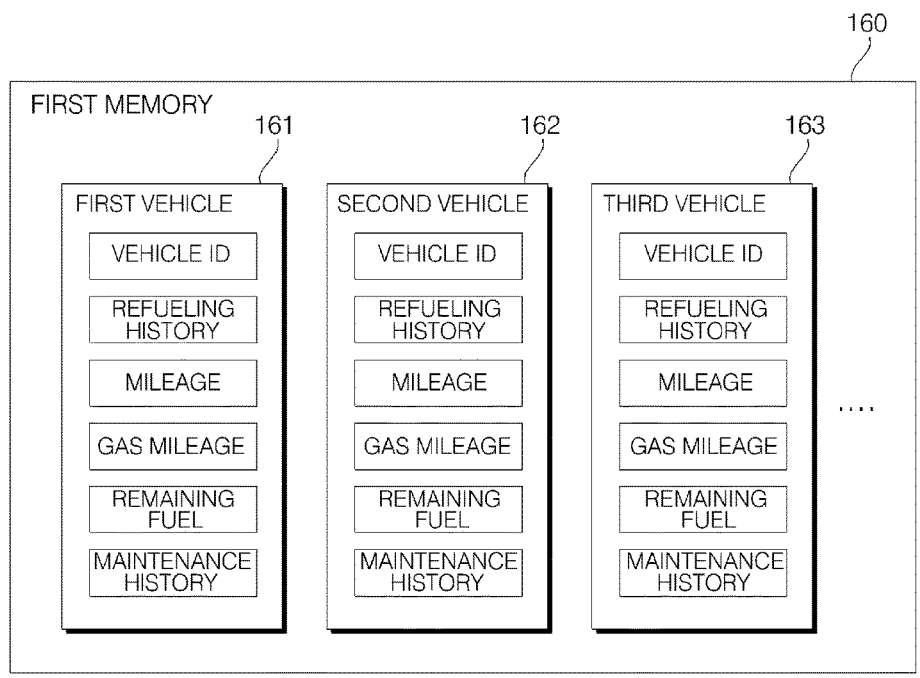
FIG. 11b is a view referred to for describing operation of storing information per vehicle when one mobile terminal is connected to a plurality of vehicles according to an embodiment of the present invention.

FIG. 11b is a view referred to for describing operation of storing information per vehicle when one mobile terminal is connected to a plurality of vehicles according to an embodiment of the present invention.

Referring to FIG. 11b, the first memory 170 may distinguishably store information on the plurality of vehicles. That is, upon connection with the first vehicle 200a, the first controller 180 distinguishably stores, in the first memory 170, information or data received from the first vehicle 200a and information or data generated in a state of being connected to the first vehicle 200*a*. Here, the information or data related to the first vehicle 200*a* may include vehicle ID, refueling history, mileage, gas mileage, remaining fuel and maintenance history.

Similarly, the first controller 180 may distinguishably store, in the first memory 170, information or data received from or generated in the second vehicle 200*b* or the third vehicle 200*c* in a state of being connected to the second vehicle 200*a* or the third vehicle 200*c*.

Figure 12:
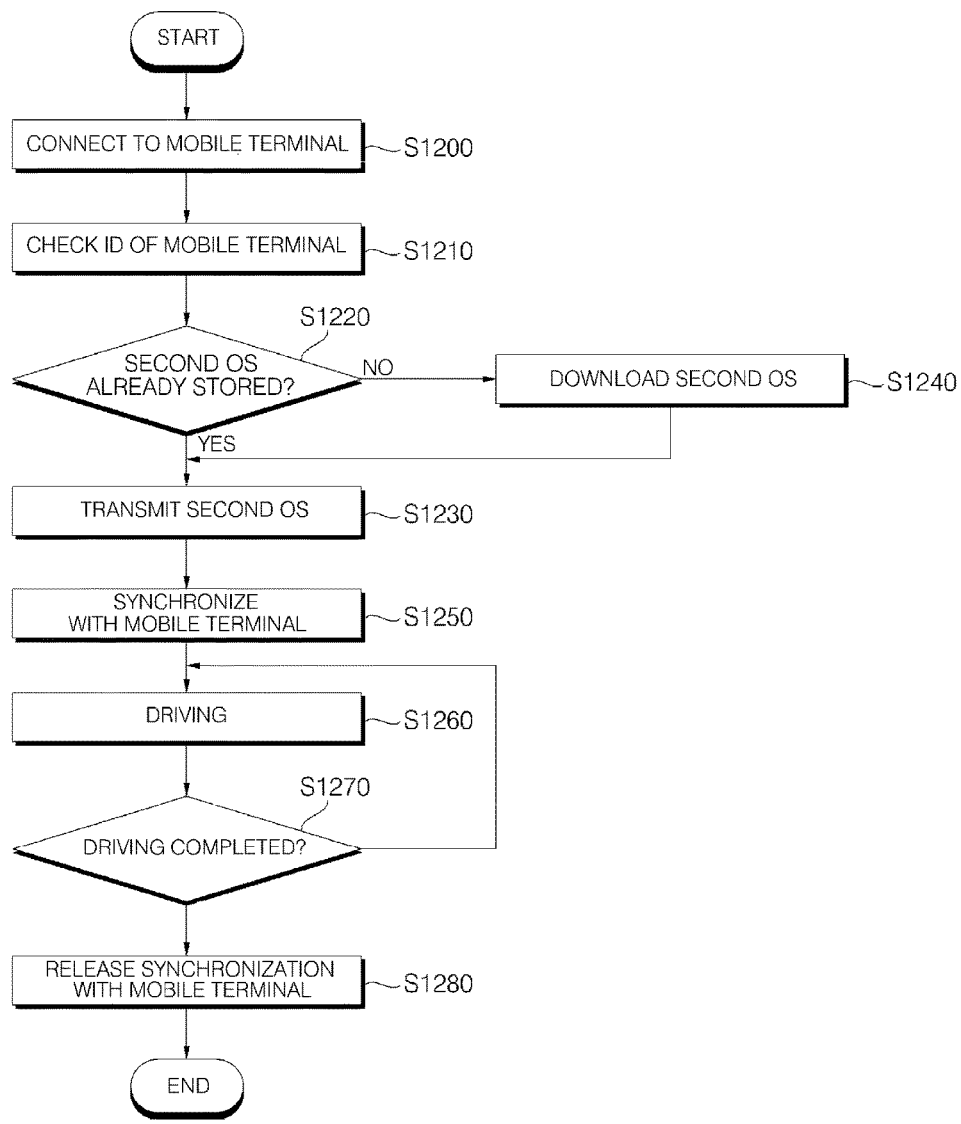
FIG. 12 is a flowchart illustrating operation of a vehicle according to an embodiment of the present invention.

FIG. 12 is a flowchart illustrating operation of a vehicle according to an embodiment of the present invention.

Referring to FIG. 12, when the second interface 260 and the first interface 160 are connected, the second controller 180 establishes connection with the mobile terminal 100 (S1200). Although connection with the mobile terminal 100 is established through the second interface 160 in this embodiment, the vehicle 200 may be connected to the mobile terminal 100 through the communication unit 210.

When the vehicle 200 is connected to the mobile terminal 100, the second controller 280 receives the ID information of the mobile terminal 100 through the second interface 260 and determines whether the received ID information of the mobile terminal 100 matches the ID information of the mobile terminal 100 stored in the second memory 270 (S1210). If the ID information matches, the mobile terminal 100 may operate as an agent.

In a state of confirming the ID information of the mobile terminal 100, the second controller 280 determines whether the second OS suitable for the connected mobile terminal 100 is already stored in the second memory 270 (S1220).

When the second OS is already stored in the second memory 270, the second controller 180 transmits the second OS to the mobile terminal 100 through the second interface 260 (S1230).

If the second OS is not already stored in the second memory 270, the second controller 280 downloads the second OS from the external server through the communication unit 210 (S1240). When downloading of the second OS is completed, the second controller 280 transmits the second OS to the mobile terminal 100 through the second interface 260 (S1230).

Upon transmission of the second OS is completed, the second controller 280 controls synchronization with the mobile terminal 100 (S1250). For example, the second controller 280 may receive user input through the mobile terminal 100, generate a control command and control each unit of the vehicle 200. In addition, the second controller 280 may receive and output a variety of information or data from the mobile terminal 100 through the second output unit 250. In addition, the second controller 280 may store, in the second memory 270, the information or data generated in a state in which the vehicle 200 is connected to the mobile terminal 100.

Upon synchronizing with the mobile terminal 100, the vehicle 200 is driven (S1260). The second controller 280 controls each unit of the vehicle 200 in a state of being suitable for vehicle driving.

Thereafter, the second controller 280 determines whether vehicle driving has been completed (S1270). Whether driving of the vehicle 200 has been completed may be determined depending on whether the vehicle is turned off, whether the vehicle 200 is not accelerated after the vehicle 200 is stopped, whether a gear is in Park (P) or whether a parking brake is engaged.

When driving of the vehicle 200 is completed, the second controller 280 releases synchronization with the mobile terminal 100 (S1280).

Figure 13A:
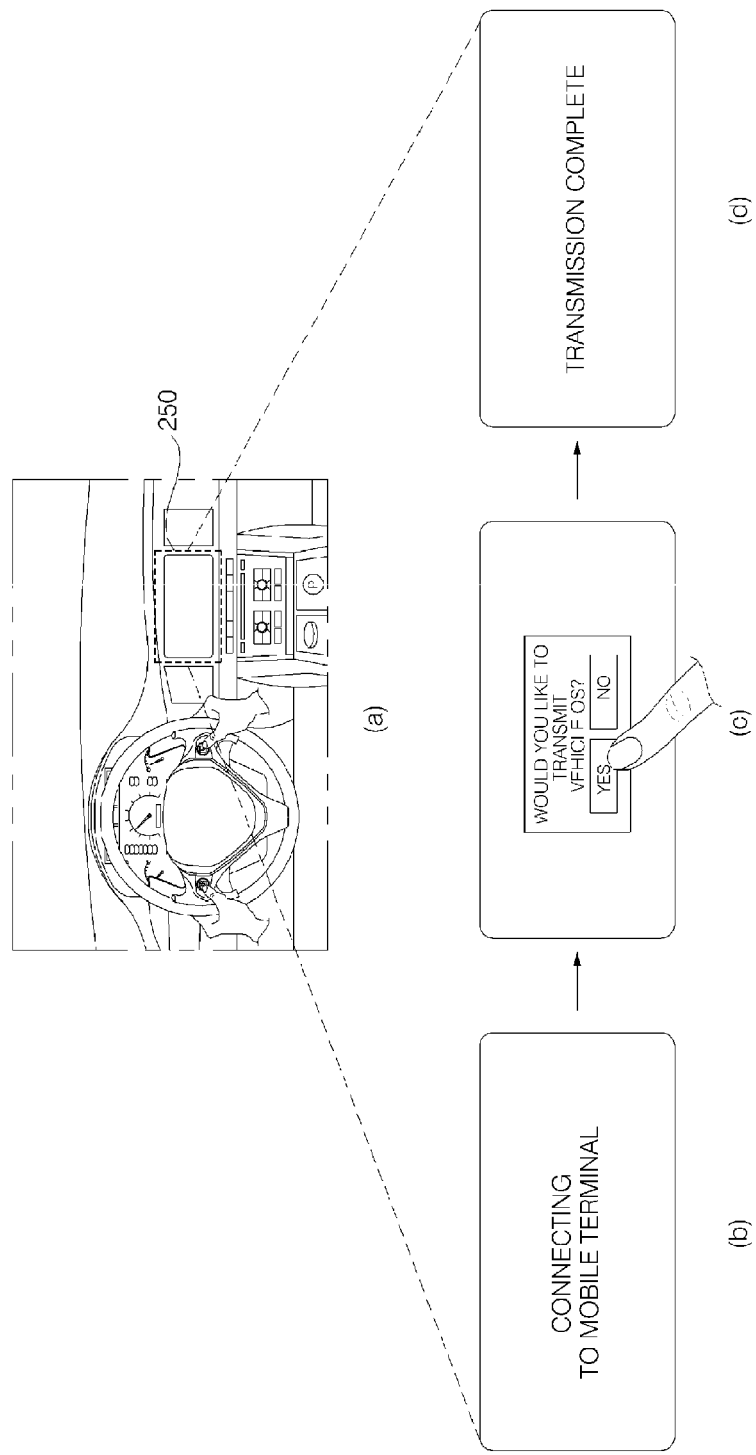
FIGS. 13a and 13b are views illustrating operation of transmitting a vehicle-dedicated OS from a vehicle to a mobile terminal according to an embodiment of the present invention.
Figure 13B:
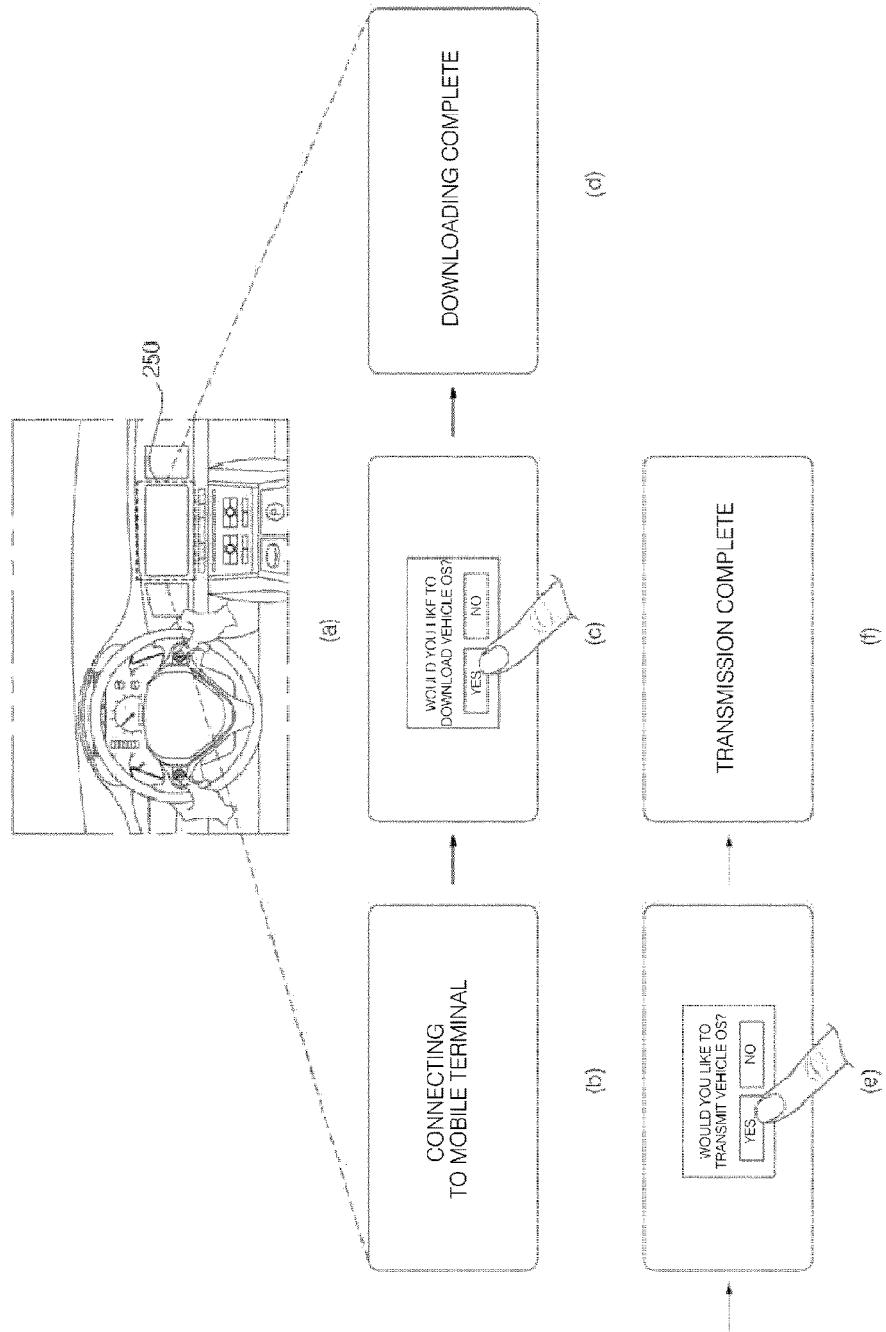

FIGS. 13*a* and 13*b* are views illustrating operation of transmitting a vehicle-dedicated OS from a vehicle to a mobile terminal according to an embodiment of the present invention.

FIG. 13*a* shows the case where the second OS is already stored in the second memory 270.

As shown in (a) of FIG. 13*a*, the vehicle 200 may include the second output unit 250. The second output unit 250 may include a display unit for visually outputting information or data, a sound output unit for audibly outputting information or data or a haptic output unit for outputting information or data in a tactile manner. In this figure, the display unit for visually outputting information or data is shown.

(b), (c) and (d) of FIG. 13*a* are enlarged views of the second output unit 250 of (a) of FIG. 13*a*.

As shown in (b) of FIG. 13*a*, when the vehicle 200 is connected to the mobile terminal 100, the second controller 280 displays a message indicating connection with the mobile terminal 100 through the second output unit 250. Meanwhile, the second controller 280 receives the ID information of the mobile terminal 100 and determines whether the received ID information matches the ID information stored in the second memory 270. If the ID information matches, the mobile terminal 100 may operate as an agent.

Thereafter, as shown in (b) of FIG. 13*a*, the second controller 280 displays a message to check whether the second OS has been transmitted to the mobile terminal 100 on the second output unit 250.

When a command for transmitting the second OS is generated according to user touch input, the second controller 280 transmits the second OS to the mobile terminal 100 through the second interface 260.

When transmission of the second OS is completed, as shown in (c) of FIG. 13*a*, a message indicating that transmission of the second OS has been completed displayed on the second output unit 250.

Although user touch input is described in this embodiment, the second controller 280 may receive user voice input through the input unit 220 and perform control according to user voice input. In addition, the second controller 280 may audibly output the message displayed on the second output unit 250 through the audio output unit (not shown).

FIG. 13*b* shows the case where the second OS is not stored in the second memory 270.

As shown in (a) of FIG. 13*b*, the vehicle 200 may include the second output unit 250. The second output unit 250 may include a display unit for visually outputting information or data, a sound output unit for audibly outputting information or data or a haptic output unit for outputting information or data in a tactile manner. In this figure, the display unit for visually outputting the information or information is shown.

(b), (c), (d), (e) and (f) of FIG. 13*b* are enlarged views of the second output unit 250 of (a) of FIG. 13*b*.

As shown in (b) of FIG. 13*b*, when the vehicle 200 is connected to the mobile terminal 100, the second controller 280 displays a message indicating connection with the mobile terminal 100 through the second output unit 250. Meanwhile, the second controller 280 receives the ID information of the mobile terminal 100 and determines whether the received ID information matches the ID information stored in the second memory 270. If the ID information matches, the mobile terminal 100 may operate as an agent.

If the second OS suitable for the connected mobile terminal 100 is not stored in the second memory 270, the second controller 280 may download the second OS from the external server through the communication unit 210.

If the second OS is not already stored in the second memory 270, as shown in (c) of FIG. 13b, the second controller 280 displays a message to check whether the second OS has been downloaded on the second output unit 250.

When a command for downloading the second OS is generated according to user touch input, the second controller 280 downloads the second OS from the external sever.

When downloading of the second OS is completed, as shown in (d) of FIG. 13b, the second controller 280 displays a downloading complete message on the second output unit 250.

Thereafter, as shown in (e) of FIG. 13b, the second controller 280 displays a message to check whether the second OS has been transmitted to the mobile terminal 100 on the second output unit 250.

When a command for transmitting the second OS is generated according to user touch input, the second controller 280 transmits the second OS to the mobile terminal 100 through the second interface 260.

When transmission of the second OS is completed, as shown in (f) of FIG. 13b, a message indicating that transmission of the second OS has been completed is displayed on the second output unit 250.

Although user touch input is described in this embodiment, the second controller 280 may receive user voice input through the input unit 220 and perform control according to user voice input. In addition, the second controller 280 may audibly output the message displayed on the second output unit 250 through an audio output unit (not shown).

Figure 14:
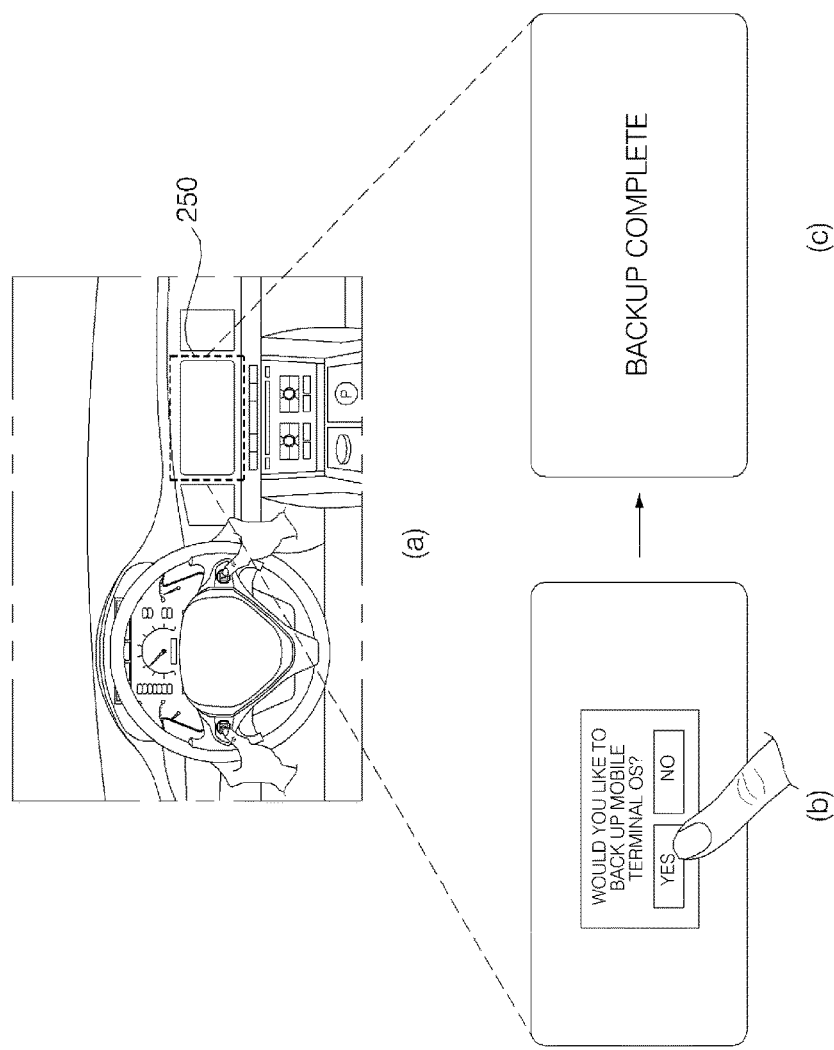
FIG. 14 is a view referred to for describing operation of backing an OS of a mobile terminal up in a vehicle when the mobile terminal and the vehicle are connected, according to an embodiment of the present invention.

FIG. 14 is a view referred to for describing operation of backing an OS of a mobile terminal up in a vehicle when the mobile terminal and the vehicle are connected, according to an embodiment of the present invention.

As shown in (a) of FIG. 14, the vehicle 200 may include the second output unit 250. The second output unit 250 may include a display unit for visually outputting information or data, a sound output unit for audibly outputting information or data or a haptic output unit for outputting information or data in a tactile manner. In this figure, the display unit for visually outputting the information or information is shown.

Here, the second output unit 250 performs a function corresponding to a backup determination unit of the present invention. Although the second output unit 250 of the vehicle 200 performs the function corresponding to the backup determination unit of the present invention, the output unit 150 of the mobile terminal 100 may be used.

Hereinafter, for convenience of description, an embodiment of performing the function corresponding to the backup determination unit of the present invention using the second output unit 250 will be described.

(b) and (c) of FIG. 14 are enlarged views of the second output unit 250 of (a) of FIG. 14.

In some embodiments, when the OS of the mobile terminal 100 is switched from the first OS to the second OS, the second controller 280 may receive and store the first OS in the second memory 270. In a state in which the vehicle 200 is connected to the mobile terminal 100, the unnecessary first OS may be received from the vehicle 200 and backed up in the second memory 270, thereby preventing overload of the mobile terminal 100.

As shown in (b) of FIG. 14, the second controller 280 displays a message to check whether the first OS has been backed up on the second output unit 250.

When a command for backing the first OS up is generated according to user touch input, the second controller 280 receives the first OS through the second interface 260 and stores the first OS in the second memory 270.

When storage of the first OS is completed, as shown in (c) of FIG. 14, the second controller 280 displays a backup complete message on the second output unit 250.

Although user touch input is described in this embodiment, the second controller 280 may receive user voice input through the input unit 220 and perform control according to user voice input. In addition, the second controller 280 may audibly output the message displayed on the second output unit 250 through an audio output unit (not shown).

Figure 15:
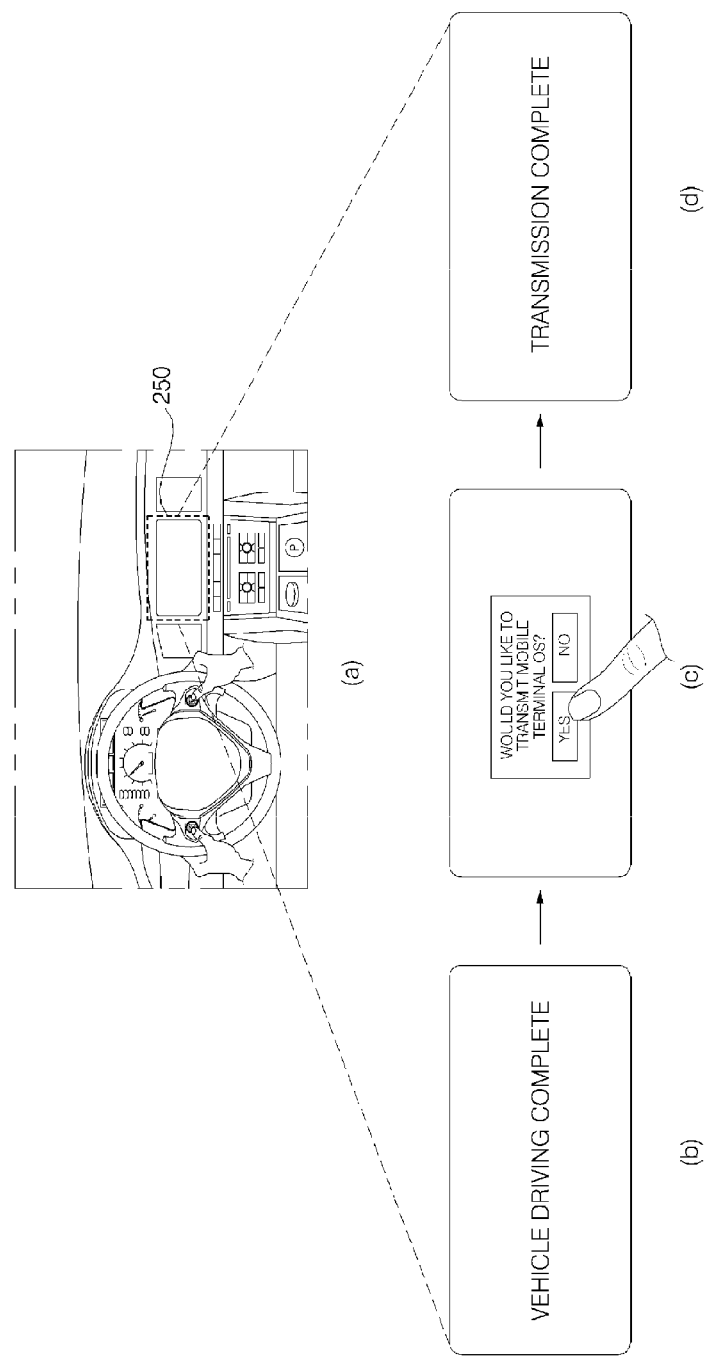
FIG. 15 is a view referred to for describing operation for transmitting an OS of a mobile terminal to the mobile terminal when vehicle driving is completed after the mobile terminal and the vehicle are connected, according to an embodiment of the present invention.

FIG. 15 is a view referred to for describing operation for transmitting an OS of a mobile terminal to the mobile terminal when vehicle driving is completed after the mobile terminal and the vehicle are connected, according to an embodiment of the present invention.

As shown in (a) of FIG. 15, the vehicle 200 may include the second output 250. The second output unit 250 may include a display unit for visually outputting information or data, a sound output unit for audibly outputting information or data or a haptic output unit for outputting information or data in a tactile manner. In this figure, the display unit for visually outputting the information or data is shown.

(b), (c) and (d) of FIG. 15 are enlarged views of the second output unit 250 of (a) of FIG. 15.

As shown in (b) of FIG. 15, when driving of the vehicle 200 is completed, the second controller 280 displays a message indicating that driving of the vehicle 200 has been completed on the second output unit 250. Whether driving of the vehicle 200 has been completed may be determined depending on whether the vehicle is turned off, whether the vehicle 200 is not accelerated after the vehicle 200 is stopped, whether a gear is in Park (P) or whether a parking brake is engaged.

When the first OS is backed up in the second memory 270, in a state in which driving of the vehicle 200 has been completed, as shown in (c) of FIG. 15, the second controller 280 displays a message to check whether the first OS has been transmitted to the mobile terminal 100 on the second output unit 250.

When a command for transmitting the first OS is generated according to user touch input, the second controller 280 transmits the first OS to the mobile terminal 100 through the second interface 260.

When transmission of the first OS is completed, as shown in (c) of FIG. 15, the second controller 280 displays a transmission complete message through the second output unit 250.

Although user touch input is described in this embodiment, the second controller 280 may receive user voice input through the input unit 220 and perform control according to user voice input. In addition, the second controller 280 may audibly output the message displayed on the second output unit 250 through an audio output unit (not shown).

Figure 16:
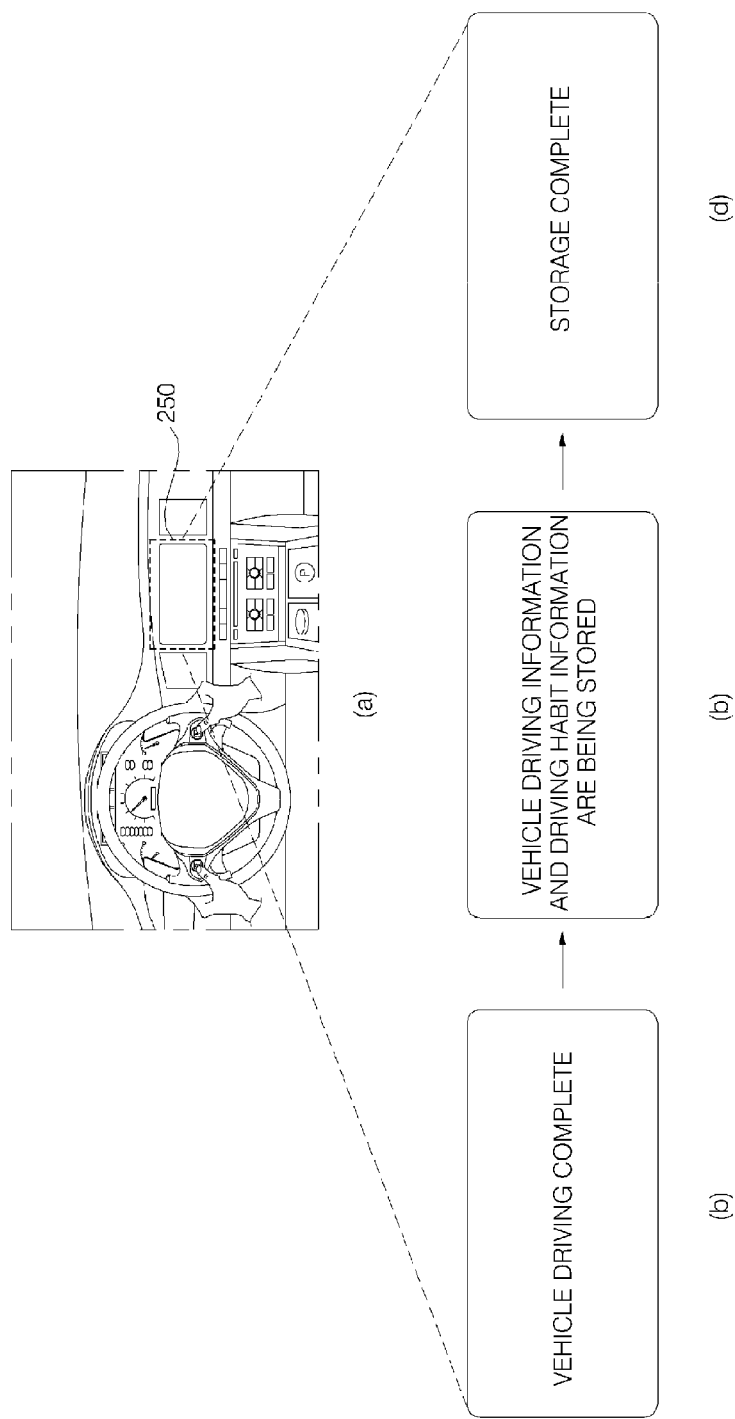
FIG. 16 is a view referred to for describing operation for storing vehicle driving information or driving habit information when vehicle driving is completed after the mobile terminal and the vehicle are connected, according to an embodiment of the present invention.

FIG. 16 is a view referred to for describing operation for storing vehicle driving information or driving habit information when vehicle driving is completed after the mobile terminal and the vehicle are connected, according to an embodiment of the present invention.

As shown in (a) of FIG. 16, the vehicle 200 may include the second output unit 250. The second output unit 250 may include a display unit for visually outputting information or data, a sound output unit for audibly outputting information or data or a haptic output unit for outputting information or data in a tactile manner. In this figure, the display unit for visually outputting the information or information is shown.

(b), (c) and (d) of FIG. 16 are enlarged views of the second output unit 250 of (a) of FIG. 16.

As shown in (b) of FIG. 16, when driving of the vehicle 200 is completed, the second controller 280 displays a message indicating that driving of the vehicle 200 has been completed on the second output unit 250.

Thereafter, the second controller 180 stores, in the second memory 270, vehicle driving information or user driving habit information collected from when the vehicle 200 is connected to when vehicle driving is completed. While the vehicle driving information or the user driving habit information is stored in the second memory 270, as shown in (c) of FIG. 16, a message indicating that the information is being stored is displayed on the second output unit 250. If storage is completed, as shown in (d) of FIG. 16, a storage complete message is displayed on the second output unit 250.

Figure 17:
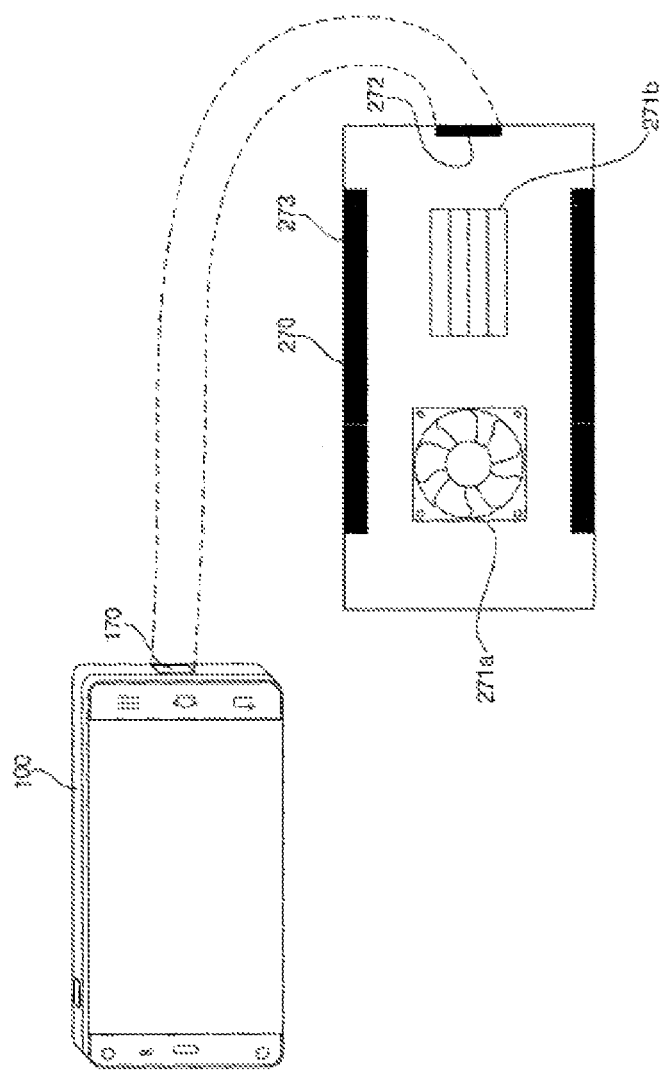
FIG. 17 is a view referred to for describing a second interface according to an embodiment of the present invention.

FIG. 17 is a view referred to for describing a second interface according to an embodiment of the present invention.

Referring to FIG. 17, the second interface 260 includes a charger 272 also serving as a connector, a cradle 273 and a cooler 271.

Although the connector and the charger are integrally configured in this embodiment, the connector and the charger may be separated.

The charger 272 also serving as the connector includes a connection port for enabling connection with the mobile terminal 100. At this time, the connection port may be configured to be compatible with a plurality of different types of mobile terminals 100.

The charger 272 also serving as the connector supplies power to the mobile terminal 100. The charger 272 also serving as the connector may supply power from the battery used to drive the vehicle 200 to the mobile terminal 100.

The cradle 273 includes a fixing part for fixing the mobile terminal 100. For example, the cradle 273 may include a fixing unit connected to at least one side surface of the second interface 260 using an elastic member to fix the body of the mobile terminal 100. The cradle 273 may be configured to compatibly mount each of a plurality of different types of mobile terminals 100.

The cooler 271 prevents the mobile terminal 100 from overheating. For example, the cooler includes at least one fan 271a and may prevent the mobile terminal 100 from overheating according to rotation of the fan. For example, the cooler 271 may include a discharging part 271b for discharging air conditioned by the air conditioner of the vehicle 200. The discharging part 271b may discharge hot air to prevent the mobile terminal 100 from overheating under control of the second controller 280.

Figure 18A:
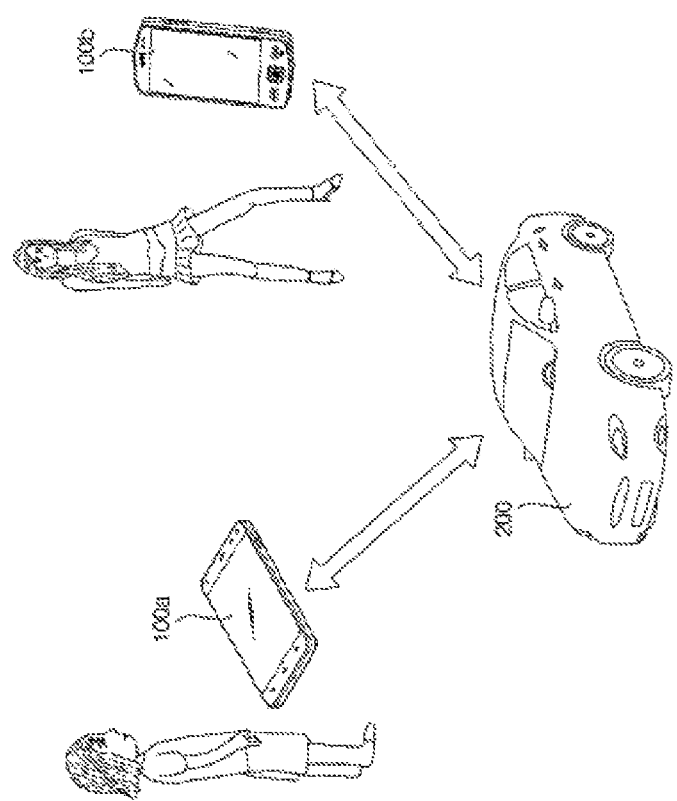
FIG. 18a is a view referred to for describing connection of a plurality of mobile terminals to one vehicle according to an embodiment of the present invention.

FIG. 18a is a view referred to for describing connection of a plurality of mobile terminals to one vehicle according to an embodiment of the present invention.

Referring to FIG. 18a, a plurality of users may use one vehicle 200. For example, if a family has one vehicle 200, a plurality of members of the family may use the vehicle 200. At this time, each member may use the mobile terminal 100.

In this case, the vehicle 200 may be connected to a first mobile terminal 100a to transmit and receive information or data including the OS. In addition, the vehicle 200 may be connected to a second mobile terminal 100b to transmit and receive information or data including the OS.

When the vehicle 200 is connected to the mobile terminal 100, the second controller 280 may determine which mobile terminal is connected through the ID information received from the mobile terminal 100a or 100b.

Figure 18B:
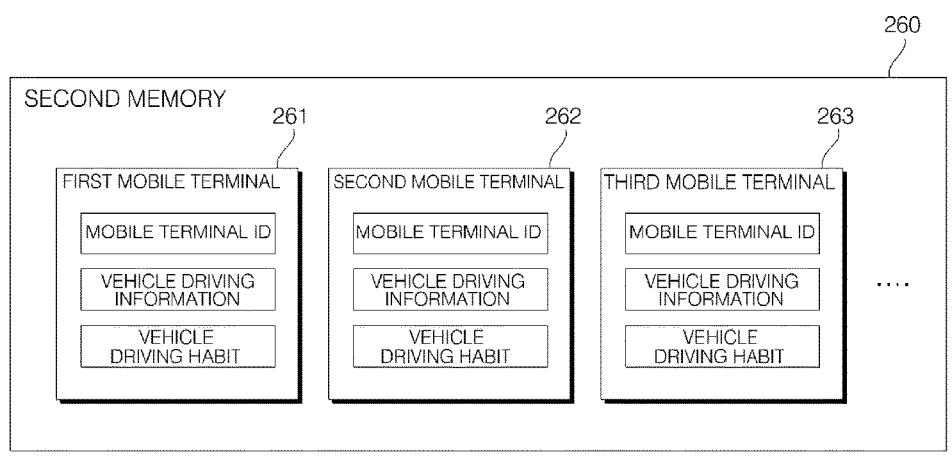
FIG. 18b is a view referred to for describing operation of storing information per mobile terminal when a plurality of mobile terminals is connected to one vehicle according to an embodiment of the present invention.

FIG. 18b is a view referred to for describing operation of storing information per mobile terminal when a plurality of mobile terminals is connected to one vehicle according to an embodiment of the present invention.

Referring to FIG. 18b, the second memory 270 distinguishably stores information on a plurality of mobile terminals. That is, when connection with the first mobile terminal 100a is established, the second controller 280 distinguishably stores, in the second memory 270, information or data received from the first mobile terminal 100a and information or data generated in a state of being connected to the first mobile terminal 100a. Here, the information or data related to the first mobile terminal 100a may a mobile terminal ID, vehicle driving information and driving habit information.

Similarly, the second controller 280 may distinguishably store, in the second memory 270, information or data received from or generated in the second mobile terminal 100b or the third mobile terminal 100c in a state of being connected to the second mobile terminal 100b or the third mobile terminal 100c.

The present invention may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller 180 of the terminal. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A mobile terminal operating using a first OS and operating as an agent upon connection with a vehicle, the mobile terminal, comprising:
   a first memory;
   a first interface configured to receive, from the vehicle, a second OS different from the first OS and dedicated to the vehicle upon connection with the vehicle; and
   a first controller configured to switch the OS from the first OS to the second OS upon connection with the vehicle,
   wherein the first memory is configured to store data of a plurality of applications,
   wherein the first controller is configured to install an application patch to execute the plurality of applications using the second OS, and
   wherein the first controller is configured to:
   upon installing the application patch, perform synchronization with the vehicle,
   receive a user input and transmit a control signal for controlling the vehicle based on the user input,
   receive data from the vehicle and output the data, and
   store generated information in the first memory in a state in which the mobile terminal is connected to the vehicle.

2. The mobile terminal according to claim 1, wherein the first controller switches the OS upon receiving user input in a state of being connected to the vehicle.

3. The mobile terminal according to claim 1, further comprising a backup determination unit configured to determine whether the first OS has been backed up in the vehicle according to user input upon switching the OS.

4. The mobile terminal according to claim 1, further comprising an information display unit configured to display OS switching information upon switching the OS.

5. The mobile terminal according to claim 1, wherein the first controller switches the OS from the second OS to the first OS upon completing driving of the vehicle after connection with the vehicle.

6. The mobile terminal according to claim 3, wherein the first interface receives the backed-up first OS upon completing driving of the vehicle after connection with the vehicle.

7. The mobile terminal according to claim 1, wherein the first memory is configured to store data of a plurality of applications, and
wherein the first controller is further configured to drive only a vehicle application among the plurality of applications upon connection with the vehicle.

8. The mobile terminal according to claim 7,
wherein the first controller is configured to preferentially drive only a vehicle safety-related application among the plurality of applications upon connection with the vehicle.

9. The mobile terminal according to claim 1, wherein the first memory is configured to store vehicle driving information or user driving habit information collected from when the vehicle is connected to when vehicle driving is completed, upon completing driving of the vehicle after connection with the vehicle.

10. The mobile terminal according to claim 1, wherein the first interface is compatible with a plurality of vehicles.

11. The mobile terminal according to claim 10, wherein the first memory is configured to distinguishably store information on each of the plurality of vehicles received through the first interface.

12. The mobile terminal according to claim 11, wherein the information includes at least one of a vehicle ID, a refueling history, a mileage, a gas mileage, remaining fuel and a maintenance history of the vehicle.

13. The mobile terminal according to claim 10, wherein the first memory is configured to store ID information of each of the plurality of vehicles, and
wherein the first controller is configured to determine whether ID information of a first vehicle received through the first interface matches any one of ID information stored in the first memory upon connection with the first vehicle.

14. The mobile terminal according to claim 1, wherein the first memory is configured to store the second OS received by the first interface from the vehicle.

* * * * *